United States Patent
Sasaki et al.

[11] Patent Number: 5,671,981
[45] Date of Patent: Sep. 30, 1997

[54] SENSOR MALFUNCTION DETECTING SYSTEM IN VEHICLE CONTROL SYSTEM

[75] Inventors: Nobuyuki Sasaki; Hirohisa Tanaka, both of Hyogo, Japan

[73] Assignee: Sumitomo Electric Industries, Ltd., Osaka, Japan

[21] Appl. No.: 633,585

[22] Filed: Apr. 17, 1996

[30] Foreign Application Priority Data

Apr. 20, 1995 [JP] Japan ................... 7-095311

[51] Int. Cl.$^6$ ................... B60T 8/10
[52] U.S. Cl. ............ 303/122.06; 303/166; 303/122.09; 303/191; 303/DIG. 4
[58] Field of Search ............ 303/122.01, 122.08, 303/122.09, 122.12, 122.13, 122.1, 122.07, DIG. 3, DIG. 4, 166, 176, 112, 122.06, 122.05, 122.04, 122.02, 191; 364/426.01, 426.02, 426.03, 424.039, 426.021; 188/181 T

[56] References Cited

U.S. PATENT DOCUMENTS

| | | | |
|---|---|---|---|
| 3,680,923 | 8/1972 | Peterson et al. | 303/159 |
| 4,414,630 | 11/1983 | Harris et al. | 303/166 |
| 4,763,960 | 8/1988 | Uchida et al. | 303/166 |
| 4,811,993 | 3/1989 | Matsumoto et al. | 303/166 |
| 4,955,671 | 9/1990 | Higashimura | 303/122.06 |
| 5,138,556 | 8/1992 | Yoshino | 303/122.06 |
| 5,343,396 | 8/1994 | Youngblood | 303/122.07 |
| 5,403,075 | 4/1995 | Fujioka | 303/166 |
| 5,404,304 | 4/1995 | Wise et al. | 303/122.08 |
| 5,435,635 | 7/1995 | Watanabe | 303/166 |
| 5,476,311 | 12/1995 | Fennel et al. | 303/122.06 |

FOREIGN PATENT DOCUMENTS 5-139279   6/1993   Japan .

*Primary Examiner*—Douglas C. Butler
*Attorney, Agent, or Firm*—W. G. Fasse; W. F. Fasse

[57] ABSTRACT

In a sensor malfunction detecting system, if an absolute value of a difference between acceleration values obtained from outputs of at least two of a pressure sensor a torque sensor, and a speed sensor, and an acceleration sensor is determined to be out of a range of a corresponding prescribed value then a corresponding count value is incremented by "1". The above described operation is repeated until the count value exceeds a prescribed target value whereupon it is determined that one of the sensors is malfunctioning, and a sensor malfunction signal is output. Accordingly, failure of a vehicle control system which controls braking force, for example, based on the output from the sensors can be prevented, which leads to improved safety during driving. Further, a sensor malfunction detecting system can be provided at a low cost.

11 Claims, 19 Drawing Sheets

000# SENSOR MALFUNCTION DETECTING SYSTEM IN VEHICLE CONTROL SYSTEM

BACKGROUND OF THE INVENTION

1. Field of the Invention

The present invention relates to a sensor malfunction detecting system, and, more specifically, to a sensor malfunction detecting system in a vehicle control system having an anti-lock brake system or traction control system (a control system for preventing wheel spin at the start of driving).

2. Description of the Background Art

A vehicle control system having a pressure sensor is disclosed, for example, in Japanese Patent Laying-Open No. 5-139279.

The conventional wheel control system for controlling braking force of the brake suppresses the speed of rotation of wheels by controlling wheel cylinder pressure.

The wheel cylinder pressure is controlled by an output from a pressure sensor detecting a master cylinder pressure generated in accordance with operation of a brake operating member.

However, such a vehicle control system as described above takes it for granted that the pressure sensor operates normally. Therefore, in case of a sensor malfunction, for example, when the detection value of the brake sensor such as the pressure sensor always indicates a constant value or when the value fluctuates regardless of the force of the driver pressing the brake pedal of the vehicle, the hydraulic pressure, the acceleration or the like, there would be a significant influence on the control system which uses the detection value from the as control information sensor.

In order to detect such a malfunction of the sensor, a device may be used which includes two or more sensors of the same type for detecting a malfunction by comparing the detection values from these two sensors. However, such a device has a high cost. The device is, for example, a detector for detecting the same physical quantity at the same position of a vehicle using a plurality of sensors of the same type, and for detecting a malfunction of the sensors by comparing the detected values from these sensors.

SUMMARY OF THE INVENTION

The present invention was made to solve the above described problem and its object is to provide a sensor malfunction detecting system for detecting malfunction of a sensor in a vehicle control system controlling braking force of a brake, for example, in order to prevent failure of the vehicle control system.

Another object of the present invention is to provide a sensor malfunction detecting system for detecting malfunction of a sensor in a vehicle control system at a low cost.

The sensor malfunction detecting system using values based on two sensor outputs includes a calculating portion for repeatedly calculating a difference between a value based on an output from a first sensor and a value based on an output from a second sensor; a determining portion for repeatedly determining whether the calculated value calculated by the calculating portion is within a prescribed range; a counting portion having a count value which can be updated in accordance with the determination by the determining portion, which count value is updated every time it is determined by the determining portion that the calculated value is out of the prescribed range; and a malfunction determining portion for determining malfunction of the sensor when the count value updated by the counter reaches a prescribed target value.

In the sensor malfunction detecting system, the difference between output values from two different sensors is calculated repeatedly, and every time it is determined that the calculated value is out of a prescribed range, the count value is updated.

When the updated value reaches a prescribed target value, it is determined that either of the sensors is malfunctioning, which information is utilized for controlling the vehicle.

As a result, undesirable influence of sensor malfunction on the vehicle control system can be prevented. Namely, failure of the vehicle control system controlling braking force of the vehicle, for example, can be prevented, which leads to improved safety in driving.

Further, since the malfunction of the sensor can be detected without using a plurality of sensors of the same type measuring the same physical amount for the same purpose, the sensor malfunction detecting system can be provided at a low cost.

The sensor malfunction detecting system using values based on three sensor outputs includes: a first calculating portion for repeatedly calculating a difference between a value based on an output from a first sensor and a value based on an output from a second sensor; a second calculating portion for repeatedly calculating a difference between the value based on the output from the first sensor and a value based on an output from a third sensor; a third calculating portion for repeatedly calculating a difference between the value based on the output from the second sensor and the value based on the output from the third sensor; a determining portion for repeatedly determining whether the first, second and third calculated values calculated by the first, second and third calculating portions are within the first, second and third prescribed ranges, respectively; a counter portion having first, second and third count values which can be updated corresponding to the first, second and third sensors, wherein among the first, second and third count values, those which correspond to sensors not related to calculation by the calculated value determined to be the prescribed value range are updated every time it is determined by the determining portion that only one of the first, second and third calculated values is within a prescribed range; and a malfunction determining portion for determining, when any of the first, second and third count values updated by the counter portion reaches a prescribed target value, that the corresponding sensor is malfunctioning.

In the sensor malfunction detecting system, differences between values based on the output from three different sensors are repeatedly calculated, and every time it is determined that only one of the calculated values is within the corresponding prescribed range, then the count value corresponding to the sensor not related to the calculated value which is within the prescribed value range is updated.

When the updated count value reaches a prescribed target value, the sensor corresponding to the count value which has reached the target value is determined to be malfunctioning, which information is utilized for controlling the vehicle.

As a result, undesirable influence of the sensor malfunction on the vehicle control system can be prevented.

More specifically, failure of the vehicle control system controlling braking force of the brake of the vehicle, for example, can be prevented, which leads to improved safety in driving.

Further, since malfunction of the sensor can be detected without using a plurality of sensors of the same type, the sensor malfunction detecting system can be provided at a low cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The sensor malfunction detecting system in accordance with the present invention will be described with reference to the figures.

(First Embodiment)

Figure 1:
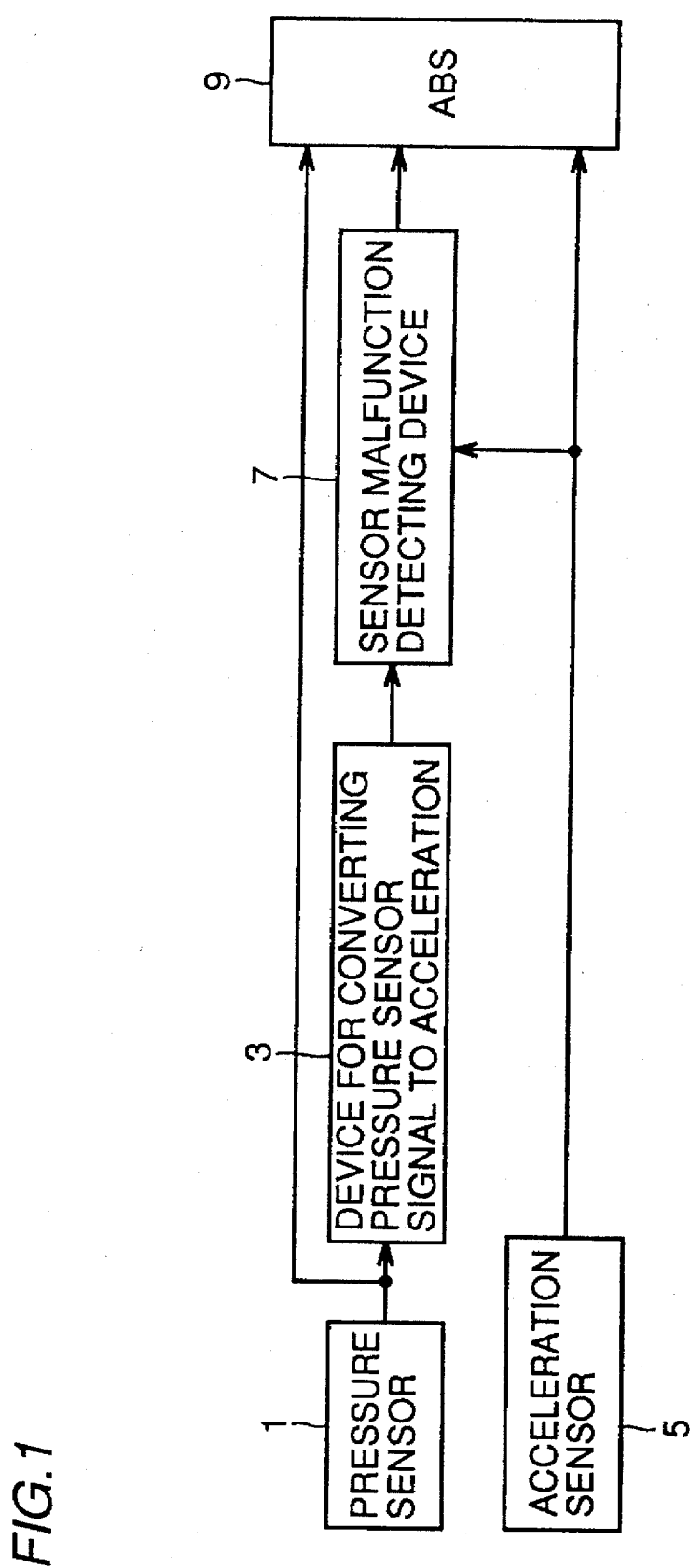
FIG. 1 is a schematic diagram showing a structure of a vehicle control system including the sensor malfunction detecting system in accordance with a first embodiment of the present invention.

FIG. 1 is a schematic diagram showing a structure of a vehicle control system including the sensor malfunction detecting system in accordance with the first embodiment of the present invention.

Referring to FIG. 1, the vehicle control system includes a pressure sensor 1, a device 3 for converting a pressure sensor signal to acceleration, an acceleration sensor 5, a sensor malfunction detecting device 7 and an anti-lock brake system (ABS) 9.

The device 3 for converting the pressure sensor signal to acceleration and the sensor malfunction detecting device 7 constitute the sensor malfunction detecting system in accordance with the first embodiment.

ABS 9 calculates a wheel speed based on the highest number or rate of rotations out of numbers or rates of rotation of four wheels detected by respective wheel speed sensors, not shown, provided on four (or three) wheels. The body speed of the vehicle is estimated from the wheel speed. The estimated body speed and the wheel speed calculated from the number of rotations of each wheel are compared, and if the wheel speed is smaller, it is determined that the wheel is locked. Therefore, the braking force of that wheel is reduced. Conversely, if the wheel speed is larger than the estimated body speed, the braking force is increased.

Pressure sensor 1 detects hydraulic pressure of the vehicle brake system (master cylinder, wheel cylinder), and applies the detected output to ABS 9 as well as to the device 3 for converting the pressure sensor signal to acceleration.

Acceleration sensor 5 is used for the ABS of four wheel drive (4 WD) vehicles, which measures acceleration or deceleration (negative acceleration) in the longitudinal direction of the vehicle. The output from acceleration sensor 5 is applied to ABS 9 as well as to sensor malfunction detecting device 7.

Acceleration sensor 5 is used in the 4 WD vehicle for the following reason. Namely, there is a possibility of cascade lock phenomenon, which is characteristic of a 4 WD vehicle in which the number or of rate rotations of the wheels decreases in a cascade manner on a road surface (snowy road or frozen road) having a low coefficient of friction, and in that case, wheel signals detected by wheel speed sensors are not available, resulting in failure of ABS 9.

Figure 2:
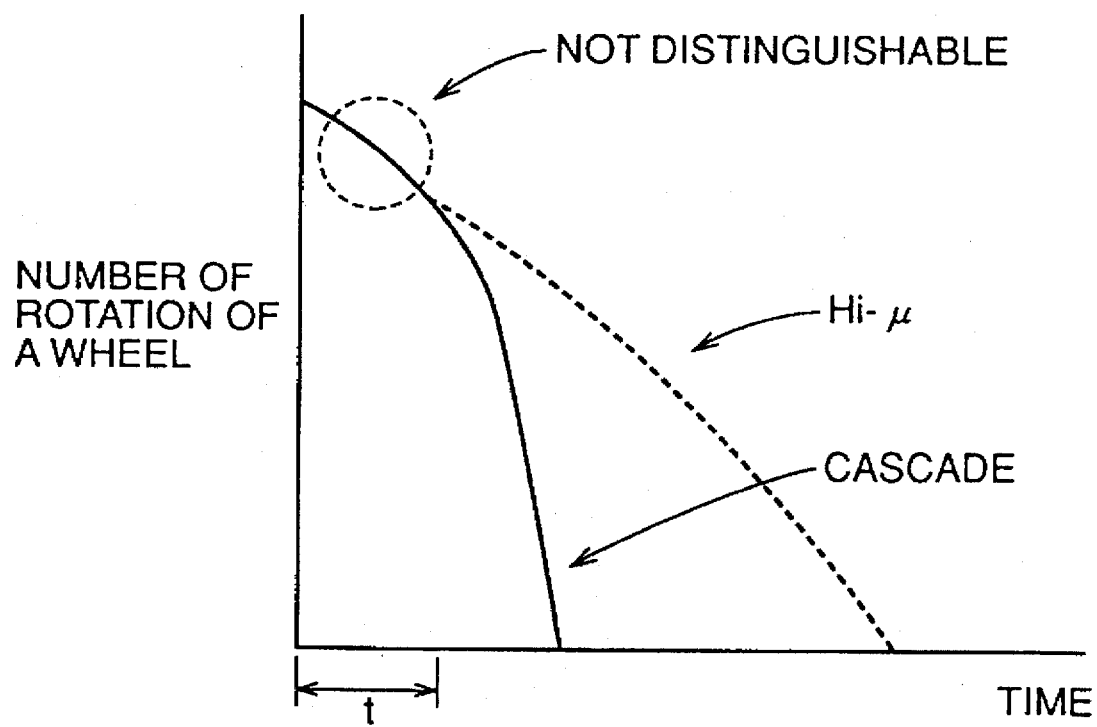
FIG. 2 shows general relation between time and reduction in number of rotation of wheels.

FIG. 2 shows a relation between time and a reduction in the number or of rate of rotations of a wheel.

Referring to FIG. 2, in the initial time period t in which the number of rotations of the wheel begins to decrease, it cannot be determined as to whether the number of rotations of the wheel is decreasing on a road surface having high coefficient of friction (Hi-μ) such as on a concrete surface, or the number of rotations of the wheel is decreasing because of cascade lock phenomenon, as shown in FIG. 2 (in which the solid line represents the number of rotations of the wheel at the time of cascade lock phenomenon, and dotted line represents the number of rotations of the wheel on a road surface having high coefficient of friction).

Therefore, as a second signal, deceleration of the body is taken, and whether the road surface has high coefficient of friction or low coefficient of friction is determined, referring to the magnitude of deceleration. If the road surface has high coefficient of friction, then the decrease in the number of rotations is determined to be normal braking, and if the load surface has low coefficient of friction, it is determined that a cascade lock phenomenon has occurred.

As for the acceleration (deceleration) of the vehicle, there are accelerations in longitudinal, lateral and vertical directions. In the present invention, cornering or the like is not taken into consideration, and therefore acceleration in the longitudinal direction is discussed.

By the device 3, acceleration of the vehicle based on the detected output from pressure sensor 1 is calculated, and acceleration information based on pressure sensor 1 and acceleration information based on the aforementioned acceleration sensor 5 are transmitted to sensor malfunction detecting device 7. Sensor malfunction detecting device 7 sends a sensor malfunction signal to ABS 9 when it determines that the sensor is malfunctioning based on the two pieces of acceleration information.

Here, acceleration (deceleration) Gp of the vehicle based on pressure sensor 1 is calculated by the device 3 in accordance with the following equation.

$$Gp=(Cf \times Pf + Cr \times Pr) \times g/W \quad (1)$$

where Cf is a front brake constant represented by the following equation.

$$Cf=2 \times B.F. \times \pi/4 \times (\text{wheel cylinder diameter})^2 \times \text{rotor effective radius}/\text{wheel radius} \quad (2)$$

where B.F. is a brake factor calculated in accordance with the following equation.

$$B.F.(\text{in case of a disk brake})=2 \times \text{coefficient of friction between pad and rotor} \quad (3)$$

where Pf is a front wheel cylinder hydraulic pressure, Cr is a rear brake constant, Pr is a rear wheel cylinder hydraulic pressure, W represents weight of the vehicle and g represents acceleration of gravity.

Pressure sensor 1 is provided at a front portion and a rear portion, for detecting front wheel cylinder hydraulic pressure Pf and rear cylinder hydraulic pressure Pr, respectively. In the following, outputs Pf and Pr from pressure sensor 1 will be generally referred to as Pm.

Figure 3:
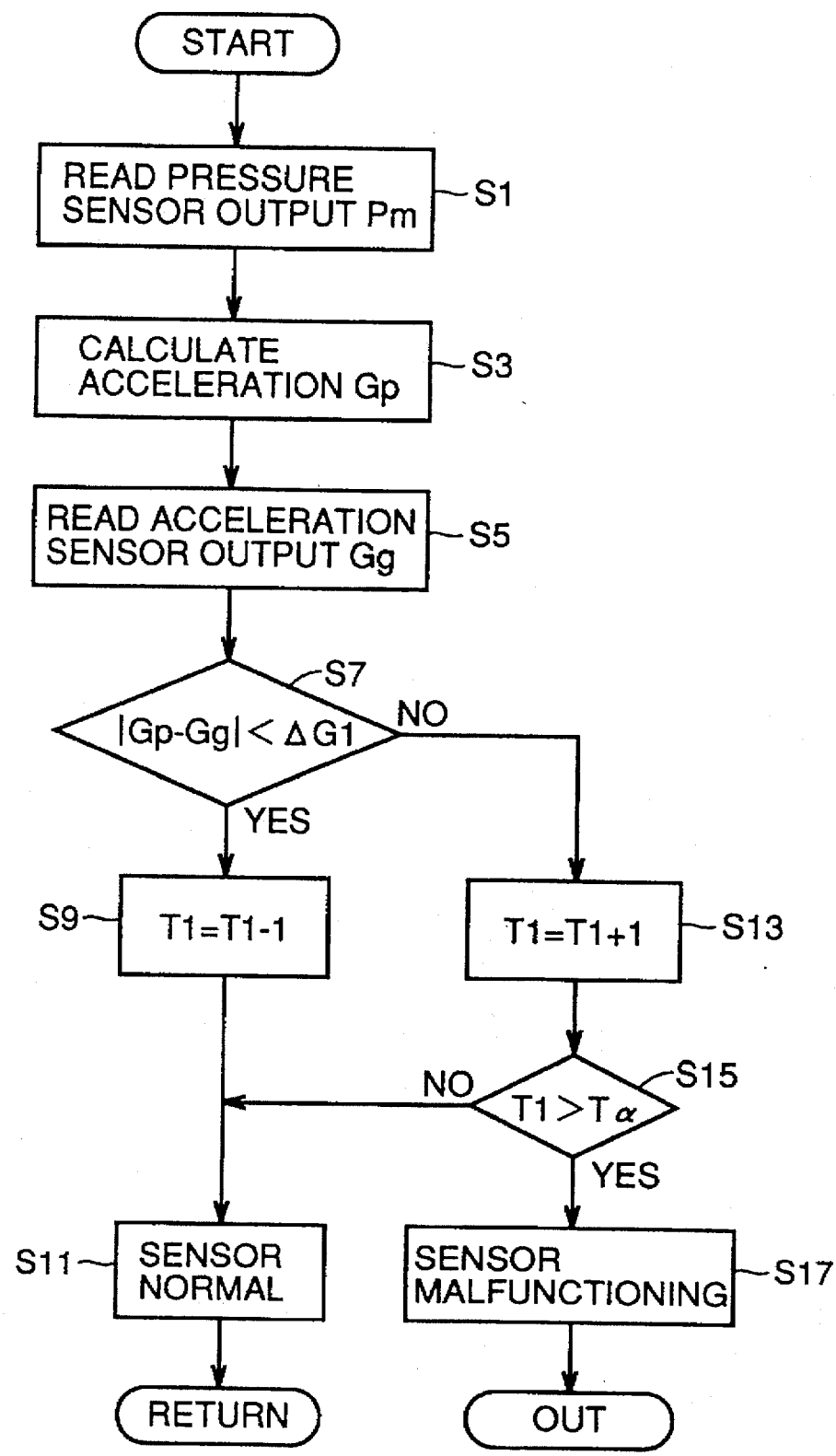
FIG. 3 is a flow chart showing the operation of the sensor malfunction detecting system in accordance with the first embodiment.

FIG. 3 is a flow chart showing the operation of the sensor malfunction detecting system in accordance with the first embodiment. The sensor malfunction detecting system is implemented in software, by using a microcomputer, as will be described in the following.

Referring to FIG. 3, the sensor malfunction detecting system in accordance with the first embodiment reads the output Pm from pressure sensor 1 in step S1.

In step S3, acceleration Gp is calculated in accordance with the equation (1) above based on the output Pm.

In step S5, acceleration Gg is read from the acceleration sensor 5.

In S7, whether an absolute value of the difference between acceleration Gp and acceleration Gg is within the range of a prescribed value ΔG1 is determined. If the absolute value of the difference between accelerations Gp and Gg is within this range, a count value T1 is decremented by "1" in S9 (the initial value of T1 is 0).

In S11, it is determined that the sensor is normally operating, and a sensor normal signal is output to ABS 9. The above described operation is repeated until it is determined that the sensor is malfunctioning.

The count value T1 does not assume a negative value. Therefore, when it is repeatedly determined that the absolute value of the difference between accelerations Gp and Gg is within the aforementioned range while T1=0, the count value T1 is kept at 0, that is, T1=0.

If it is determined in S7 that the absolute value of the difference between accelerations Gp and Gg is out of the aforementioned range, the count value T1 is incremented by "1" in S13.

If the count value T1 is smaller than a prescribed target value Tα in S15, it is determined that the sensor is normally operating in S11, and a sensor normal signal is output to ASB 9. The above described operation is repeated until it is determined that the sensor is malfunctioning.

In S15, if the count value T1 is larger than the prescribed target value Tα, it is determined that the abnormal output state of the sensor has continued for a sufficiently long period, and it is determined in S17 that the sensor is malfunctioning and a sensor malfunction signal is output to ABS 9.

Here, the prescribed value ΔG1 in step S7 is calculated based on the error of the accelerations obtained from the pressure sensor and the acceleration sensor. The error in acceleration obtained from the pressure sensor derives from initial variation of the sensor, temperature drift, degradation and accuracy in calculation. The error in acceleration obtained from the acceleration sensor derives from the initial variation of the sensor, temperature drift, degradation and accuracy in calculation.

For example, if the error in the pressure sensor and the acceleration sensor are ±5% and ±3%, respectively, the total error of the pressure sensor and the acceleration sensor is ±8%.

The prescribed target value Tα in S15 means time sufficient for determining malfunction of the sensor. More specifically, in ideal conditions, if an abnormal voltage out of a normal output voltage range is recognized one moment, then the sensor should be determined as malfunctioning. However, in actual practice there is a case in which an abnormal voltage is generated only at a moment and normal voltage range is immediately resumed because of generation of electric noise. In such a case, if the sensor is determined to be malfunctioning, that determination would be an error. Therefore, the prescribed target value Tα is determined based on the noise level, amount of noise and filter value of the sensor.

In the present embodiment, the process shown in the flow chart of FIG. 3 is carried out at every 8 ms (milliseconds). In other words, the incrementing value of the counter (counter portion) at every one control cycle time (8 ms) is "1". In the present invention, the time sufficient for determining malfunction of the sensor is set at 1000 ms (milliseconds) in the present embodiment. Therefore, if the value of the counter exceeds 125, it is determined that the sensor is malfunctioning. In other words, the prescribed target value Tα of S15 is 125.

Generally, the time DT sufficient for determining malfunction of the sensor is represented by the following equation, using the prescribed target value Tα, incrementing value I per one control cycle time and one control cycle time CT.

$$DT=(T\alpha/I) \times CT \quad (4)$$

Therefore, the time DT sufficient for determining malfunction of the sensor is determined, and hence of either one of the prescribed target value Tα and the incrementing value I per one control cycle time are known or given, the other is determined naturally.

As described above, in the first embodiment, the difference between the acceleration Gp based on the output from the pressure sensor and the acceleration Gg based on the output from the acceleration sensor is calculated repeatedly, and every time it is determined that the absolute value of the difference is out of the range of a prescribed value ΔG1, the counter value is updated, i.e. incremented. When the updated value reaches the prescribed target value Tα, it is determined that either of the sensors is malfunctioning, and sensor malfunction signal is output.

As a result, undesirable influence caused by the malfunction of the sensor on the vehicle control system can be prevented. Therefore, failure of the vehicle control system controlling the braking force of the vehicle, for example, can be prevented, which leads to improved safety of the driver in driving.

Further, since malfunction of the sensor can be detected without using a plurality of sensors of the same type measuring the same physical amount for the same purpose, the sensor malfunction detecting system can be provided at a low cost.

(Second Embodiment)

Figure 4:
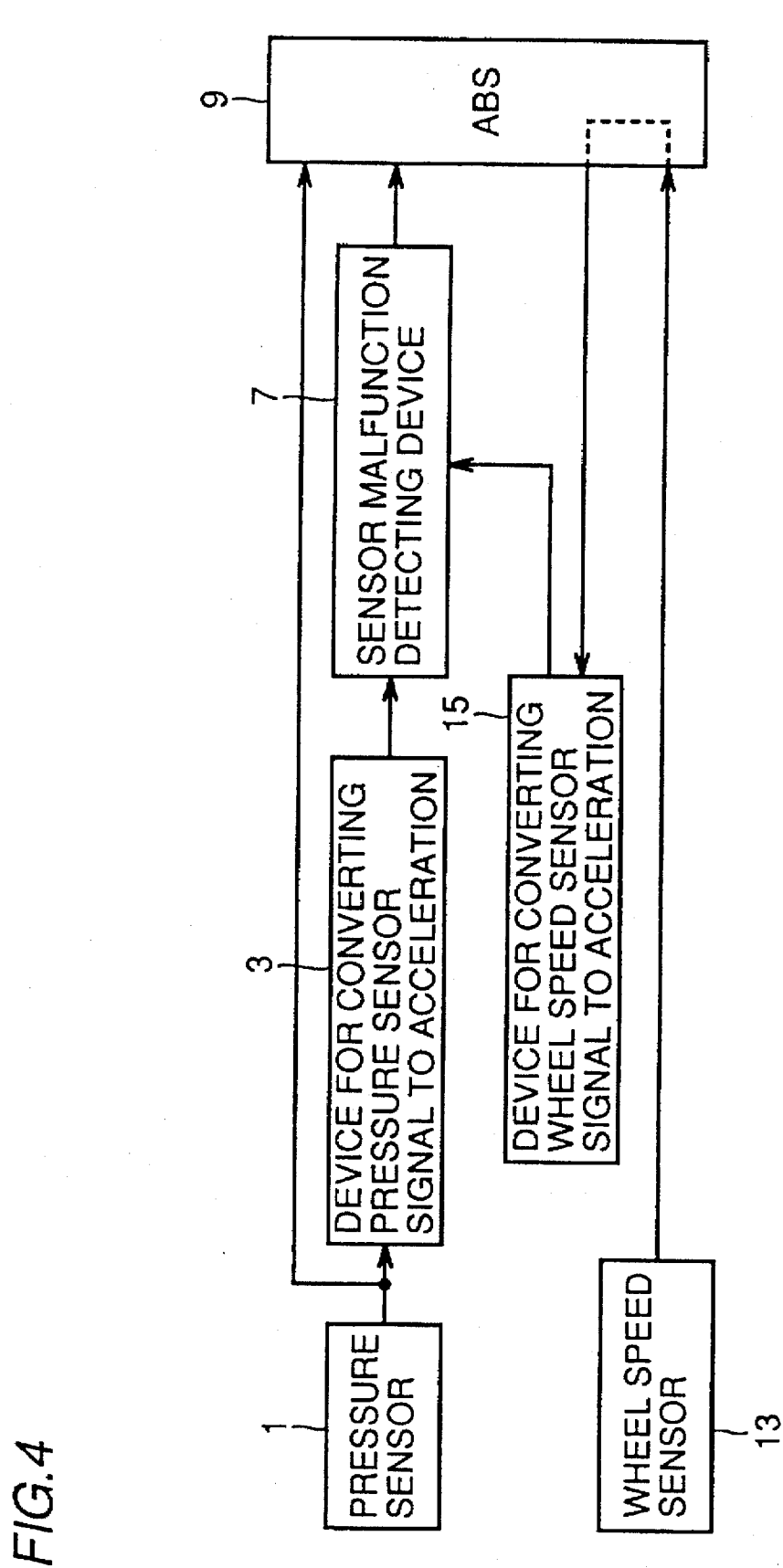
FIG. 4 is a schematic diagram showing a structure of a vehicle control system including a sensor malfunction detecting system in accordance with a second embodiment of the present invention.

FIG. 4 is a schematic diagram showing a structure of a vehicle control system including the sensor malfunction detecting system in accordance with the second embodiment of the present invention.

Referring to FIG. 4, the vehicle control system includes a pressure sensor 1, a device 3 for converting a pressure sensor signal to acceleration, a wheel speed sensor 13, a device 15 for converting a wheel speed sensor signal to acceleration, a sensor malfunction detecting device 7 and an ABS 9.

The device 3 for converting the pressure sensor signal to acceleration, the device 15 for converting the wheel speed sensor signal to acceleration and the sensor malfunction detecting device 7 constitute the sensor malfunction detecting system in accordance with the second embodiment.

Pressure sensor 1 detects the hydraulic pressure of the vehicle brake system, and applies the detection output to ABS 9 and to device 3 for converting the pressure sensor signal to acceleration. The device 3 calculates acceleration of the vehicle based on the output from pressure sensor 1 in the same manner as in the first embodiment, and applies the calculated acceleration to sensor malfunction detecting device 7.

Wheel speed sensor 13 detects the number or rate of rotations of the wheel of the vehicle. The output from wheel speed sensor 13 is applied to ABS 9, and the vehicle speed is calculated based thereon by ABS 9. ABS 9 transmits the value of the vehicle speed to device 15 for converting the wheel speed sensor signal to acceleration.

It is easy to detect the wheel speed by wheel speed sensor 13. However, actually it is not easy to detect the actual vehicle speed by means of an inexpensive sensor. Therefore, generally, the vehicle body speed is estimated from the wheel speed based on the wheel speed sensor 13 so as to enable control by the ABS 9. ABS 9 is the same as ABS 9 of the first embodiment.

The device 15 for converting the wheel speed sensor signal to acceleration calculates acceleration of the vehicle by differentiating the vehicle speed based on the output value from wheel speed sensor 13 calculated by ABS 9, and applies the result to sensor malfunction detecting device 7.

When sensor malfunction detecting device 7 determines that the sensor is malfunctioning based on the acceleration information from device 3 for converting the pressure sensor signal to acceleration and the device 15 for converting the wheel speed sensor signal to acceleration, it sends a sensor malfunction signal to ABS 9.

Figure 5:
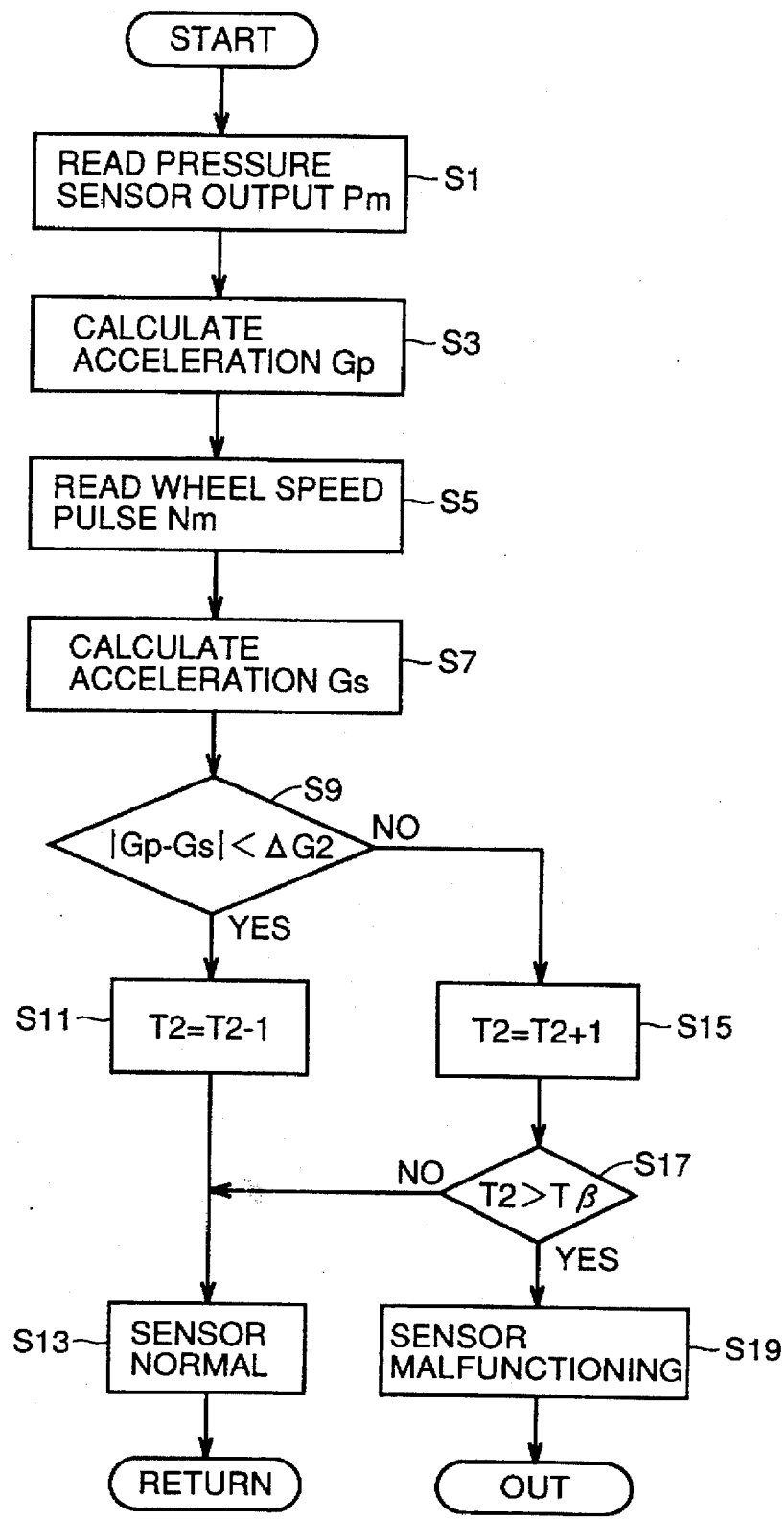
FIG. 5 is a flow chart showing the operation of the sensor malfunction detecting system in accordance with the second embodiment.

FIG. 5 is a flow chart showing the operation of the sensor malfunction detecting system in accordance with the second embodiment.

Referring to FIG. 5, in the sensor malfunction detecting system in accordance with the second embodiment, the output Pm from pressure sensor 1 is read in S1.

In S3, acceleration Gp is calculated in accordance with the equation (1) above, based on the output Pm.

In S5, the sensor malfunction detecting system reads an output value (wheel speed pulse) Nm from wheel speed sensor 13.

In S7, acceleration Gs is calculated based on the vehicle speed that has been calculated by ABS 9 based on the output Nm from wheel speed sensor 13.

In step S9, the sensor malfunction detecting system determines whether or not the absolute value of the difference between accelerations Gp and Gs is within a range of a prescribed value ΔG2.

The processes from step S11 to S19 are the same as the steps S9 to S17 of the first embodiment.

Here, the count value T2 in steps S15 and S11 correspond to the count value T1 in steps S9 and S13 of the first embodiment. The prescribed target value Tβ in step S17 corresponds to the prescribed target value Tα of step S15 in the first embodiment.

The prescribed value ΔG2 is calculated based on the error in accelerations, calculated from the output from the pressure sensor and the wheel speed sensor. The error of the acceleration obtained from the pressure sensor derives from the initial variation of the sensor, temperature drift, degradation and accuracy in calculation. The error in acceleration obtained from the wheel speed sensor derives from calculation error. For example, if the error in the pressure sensor and in the wheel speed sensor are ±5% and ±2%, respectively, the total error of the pressure sensor and the wheel speed sensor is ±7%.

The prescribed target value Tβ is set to 125, for example, same as the target value Tα in the first embodiment.

As described above, in the second embodiment, the difference between the values obtained based on the output from the pressure sensor and the wheel speed sensor is calculated repeatedly, and every time it is determined that the calculated value is out of the range of the prescribed value ΔG2, the count value T2, is updated i.e. increment in S15. When the updated value reaches the prescribed target value Tβ, it is determined that either of the sensors is malfunctioning, and a sensor malfunction signal is output.

As a result, similar effects as in the first embodiment can be obtained by the sensor malfunction detecting system in accordance with the second embodiment.

(Third Embodiment)

Figure 6:
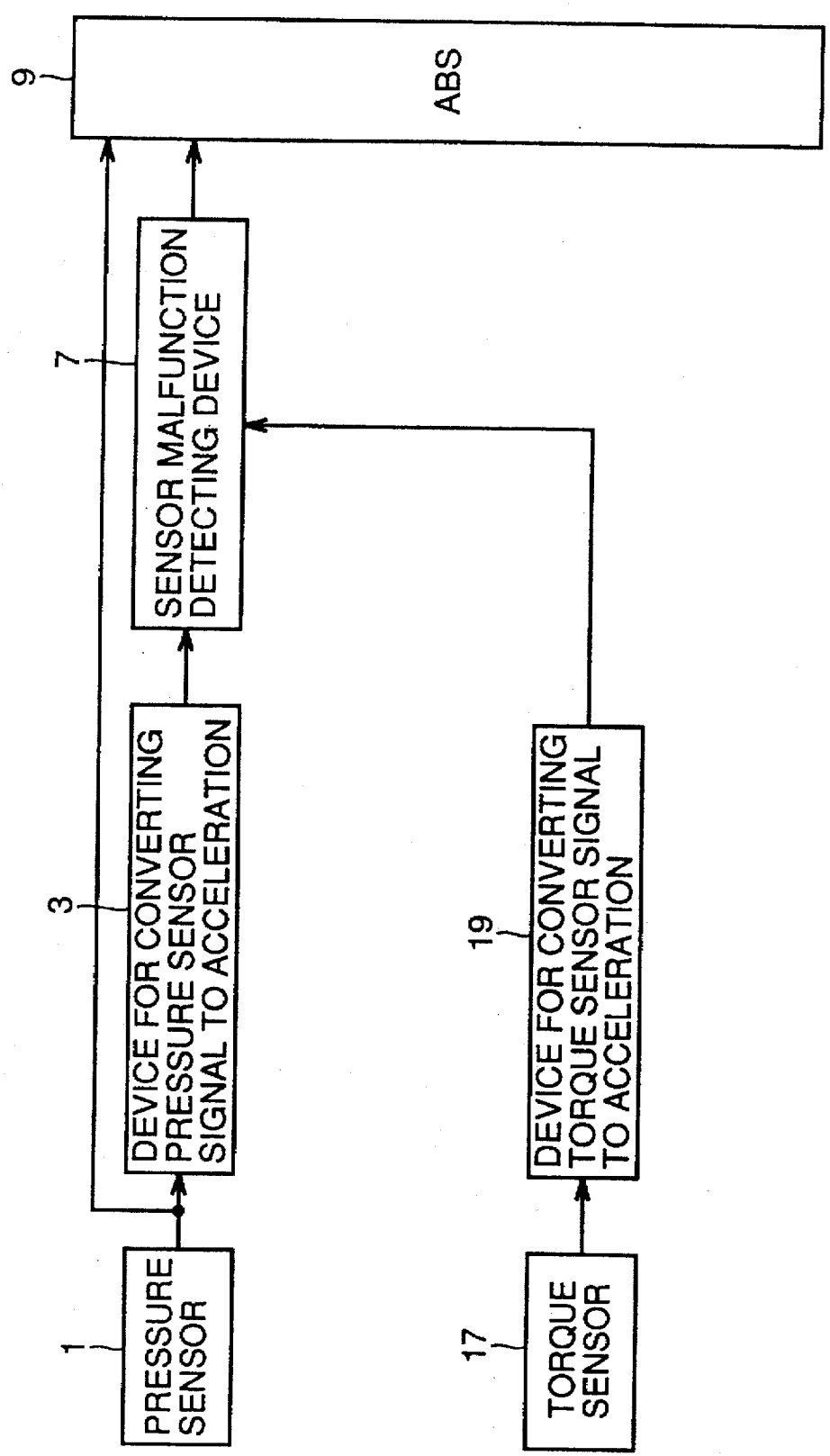
FIG. 6 is a schematic diagram showing a structure of a vehicle control system including a sensor malfunction detecting system in accordance with a third embodiment of the present invention.

FIG. 6 is a schematic diagram showing the vehicle control system including the sensor malfunction detecting system in accordance with the third embodiment of the present invention.

Referring to FIG. 6, the vehicle control system includes a pressure sensor 1, a device 3 for converting the pressure sensor signal to acceleration, a torque sensor 17, a device 19 for converting the torque sensor signal to acceleration, a sensor malfunction detecting device 7 and an ABS 9.

The device 3 for converting pressure sensor signal to acceleration, the device 17 for converting torque sensor signal to acceleration and the sensor malfunction detecting device 7 constitute the sensor malfunction detecting system in accordance with the third embodiment.

The pressure sensor 1, the device 3 for converting pressure sensor signal to acceleration and ABS 9 are the same as pressure sensor 1, device 3 for converting pressure sensor signal to acceleration and ABS 9 of the first and second embodiments.

Pressure sensor 1 detects hydraulic pressure of the vehicle brake system, and applies the detection output to ABS 9 and to device 3. Torque sensor 17 detects brake torque of the vehicle. The device 19 for converting torque sensor signal to acceleration calculates acceleration of the vehicle based on the output from torque sensor 17 in accordance with the following equation, and applies the result to sensor malfunction detecting device 7.

$$Gt=\{(Trf/Rtf)+(Trr/Rtr)\}\times g/W \quad (5)$$

where Trf represents brake torque at a front portion of the vehicle, Trr represents brake torque at a rear portion of the vehicle, Rtf represents distance from front shaft center to torque measuring point, and Ttr represents distance from rear shaft center to torque measuring point. The torque sensor 17 is provided at a front portion and at a rear portion of the vehicle, for detecting front brake torque Trf and rear brake torque Trr, respectively. The outputs Trf and Trr from torque sensor 17 will be generally referred to as Trm in the following.

When sensor malfunction detecting device 7 determines that the sensor is malfunctioning based on the acceleration information from device 3 for converting pressure sensor signal to acceleration and device 19 for converting torque sensor signal to acceleration, it sends a sensor malfunction signal to ABS 9.

Figure 7:
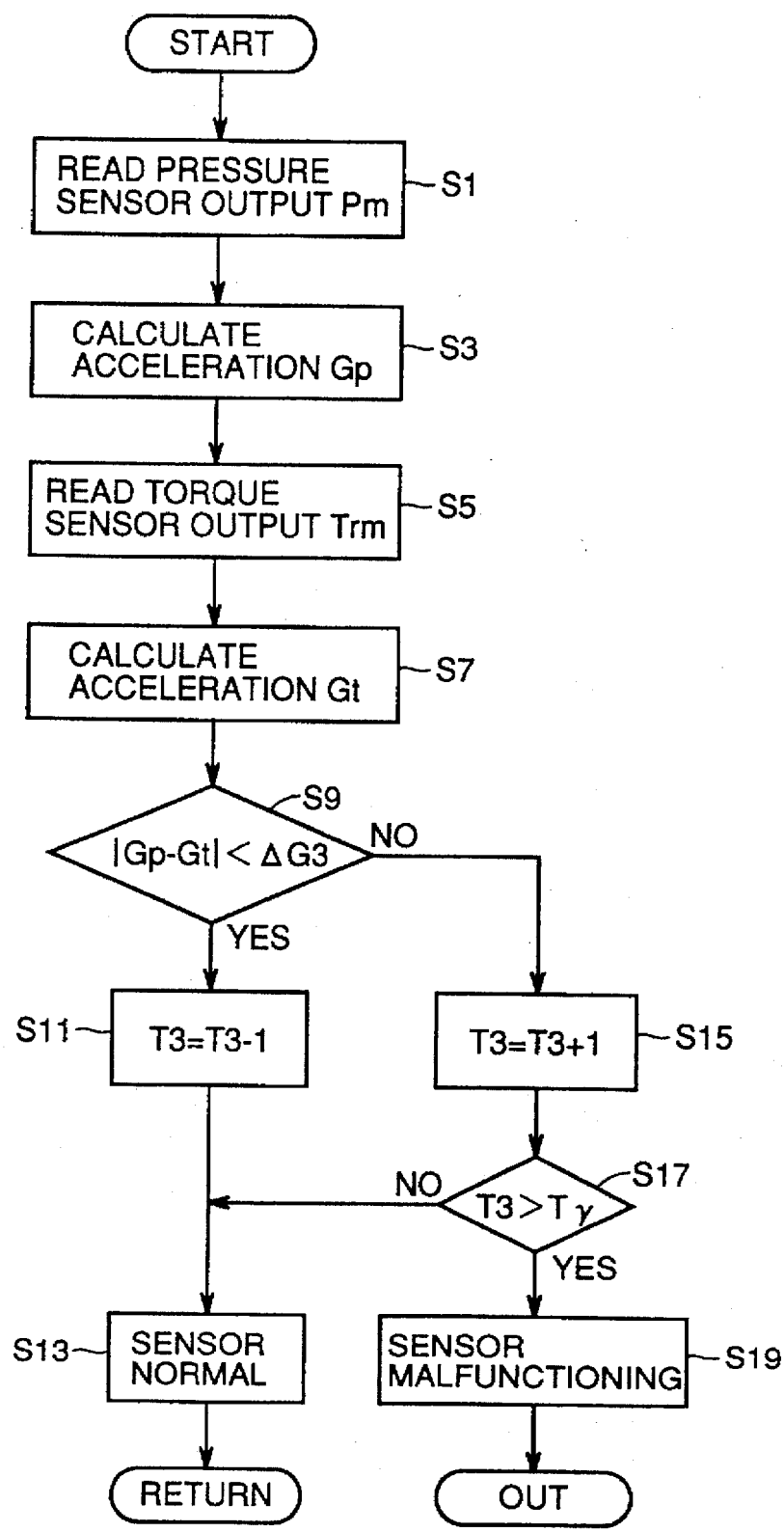
FIG. 7 is a flow chart showing the operation of the sensor malfunction detecting system in accordance with the third embodiment.

FIG. 7 is a flow chart showing the operation of the sensor malfunction detecting system in accordance with the third embodiment.

Referring to FIG. 7, in the sensor malfunction detecting system in accordance with the third embodiment, in step S1, the output Pm from pressure sensor 1 is read.

In S3, acceleration Gp is calculated based on the output Pm, in accordance with the equation (1) described in the first embodiment. In step S5, the sensor malfunction detecting systems reads the output value Trm from torque sensor 17.

In S7, acceleration Gt is calculated in accordance with the equation (5) based on the output Trm.

In S9, the sensor malfunction detecting system determines whether or not the absolute value of the difference between accelerations Gp and Gt is within the range of a prescribed value ΔG3.

The operation in steps S11 to S19 is the same as the operation from steps S9 to S17 shown in FIG. 3 of the first embodiment.

Here, count value T3 in steps S11 and S15 corresponds to the count value T1 of the steps S9 and S13 of the first embodiment. The prescribed target value Tγ in step S17 corresponds to the prescribed target value Tα of step S15 of the first embodiment.

The prescribed value ΔG3 is calculated based on the error in acceleration calculated from the outputs of the pressure sensor and the torque sensor.

The prescribed target value Tγ is set to 125, for example, as Tα in step S15 of the first embodiment shown in FIG. 3.

As described above, in the third embodiment, the difference between the values based on the output from the pressure sensor and the torque sensor is calculated repeatedly, and every time it is determined that the calculated value is out of the range of the prescribed value ΔG3, the count value T3 is updated in S15. When the updated value reaches the prescribed target value Tγ, either of the sensors is determined to be malfunctioning and the sensor malfunction signal is output.

As a result, similar effects as in the first embodiment can be obtained by the sensor malfunction detecting system in accordance with the third embodiment.

(Fourth Embodiment)

Figure 8:
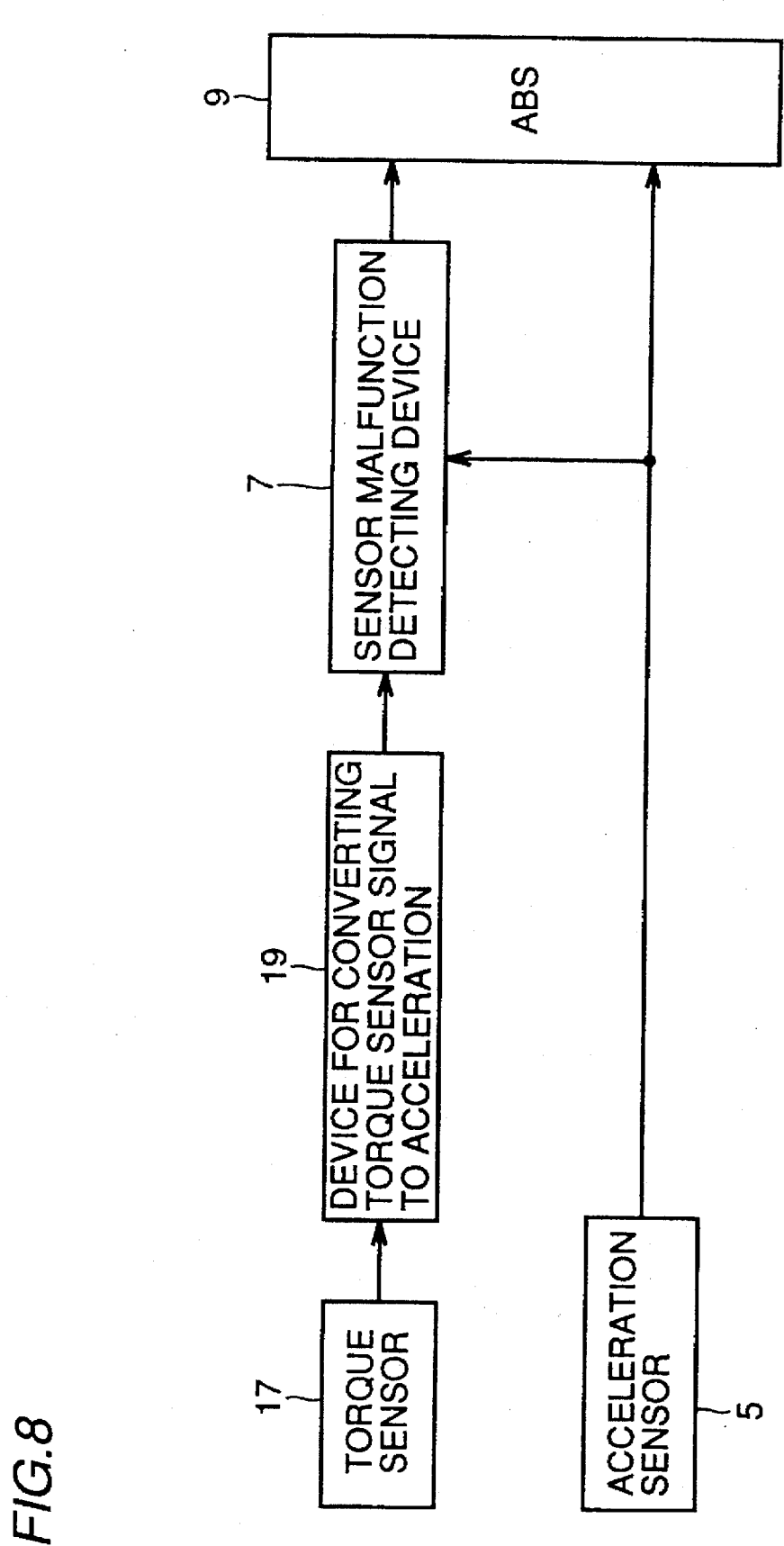
FIG. 8 is a schematic diagram showing a structure of a vehicle control system including a sensor malfunction detecting system in accordance with a fourth embodiment of the present invention.

FIG. 8 is a schematic diagram showing a structure of a vehicle control system including the sensor malfunction detecting system in accordance with the fourth embodiment of the present invention.

Referring to FIG. 8, the vehicle control system includes a torque sensor 17, a device 19 for converting a torque sensor signal to acceleration, an acceleration sensor 5, a sensor malfunction detecting device 7 and an ABS 9.

The device 19 for converting torque sensor signal to acceleration and the sensor malfunction detecting device 7 constitute the sensor malfunction detecting system in accordance with the fourth embodiment.

Torque sensor 17, device 19 for converting torque sensor signal to acceleration, acceleration sensor 5 and ABS 9 are the same as the corresponding sensors, device for converting to acceleration and ABS shown in the first and third embodiments.

Torque sensor 17 detects brake torque of the vehicle and applies the result to device 19 for converting torque sensor signal to acceleration. Acceleration sensor 5 applies a signal therefrom to ABS 9 and to sensor malfunction detecting device 7. Sensor malfunction detecting device 7 transmits, when it determines that the sensor is malfunctioning based on the acceleration information from the device 19 and from the acceleration sensor 5, a sensor malfunction signal to ABS 9.

Figure 9:
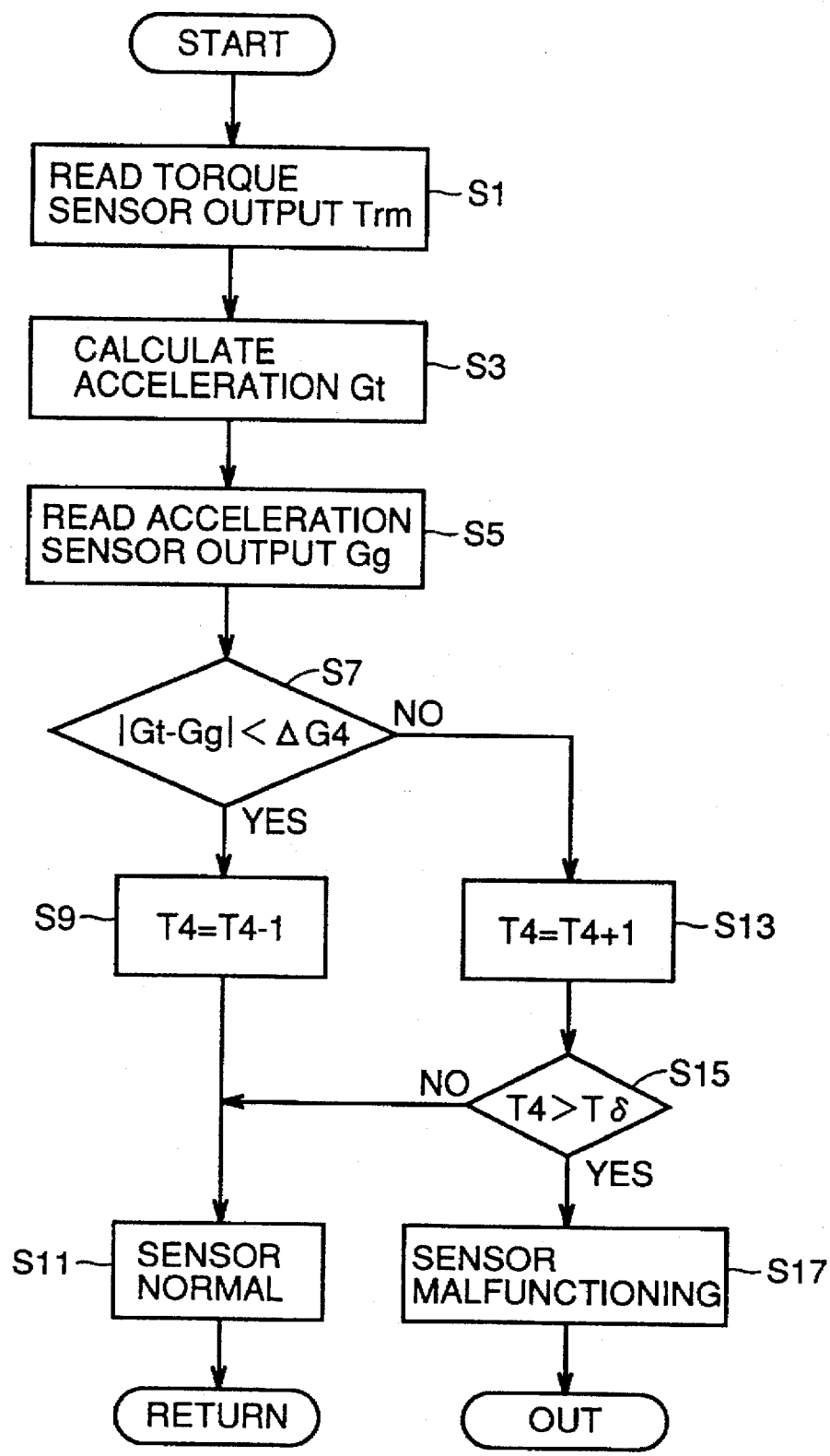
FIG. 9 is a flow chart showing the operation of the sensor malfunction detecting system in accordance with the fourth embodiment.

FIG. 9 is a flow chart showing the operation of the sensor malfunction detecting system in accordance with the fourth embodiment.

Referring to FIG. 9, in the sensor malfunction detecting system in accordance with the fourth embodiment, in step S1, an output Trm of torque sensor 17 is read.

In step S3, acceleration Gt is calculated based on the output Trm in accordance with the equation (5). In S5, the sensor malfunction detecting system reads an output value Gg from acceleration sensor 5.

In step S7, the sensor malfunction detecting system determines whether or not the absolute value of the difference between accelerations Gt and Gg is within the range of the prescribed value ΔG4.

The processes from step S9 to step S17 are the same as those from steps S9 to S17 of the first embodiment shown in FIG. 3.

Here, count value T4 in S9 and S13 corresponds to the count value T1 of S9 and S13 of the first embodiment shown in FIG. 3. The prescribed target value Tδ of S15 corresponds to the prescribed target value Tα of S15 of the first embodiment shown in FIG. 3.

The prescribed value ΔG4 is calculated from the error in acceleration calculated based on the output from the torque sensor and the acceleration sensor.

Further, the prescribed target value Tδ is set to 125, for example, same as Tα of the first embodiment shown in FIG. 3.

As described above, in the fourth embodiment, the difference between values based on the outputs from the torque sensor and the acceleration sensor is calculated repeatedly, and every time it is determined that the calculated value is out of the range of the prescribed value ΔG4, the count value T4 is updated in S13. When the count value reaches the prescribed target value Tδ, either of the sensors is determined to be malfunctioning, and the sensor malfunction signal is output.

As a result, similar effects as the first embodiment can be obtained by the sensor malfunction detecting system in accordance with the fourth embodiment.

(Fifth Embodiment)

Figure 10:
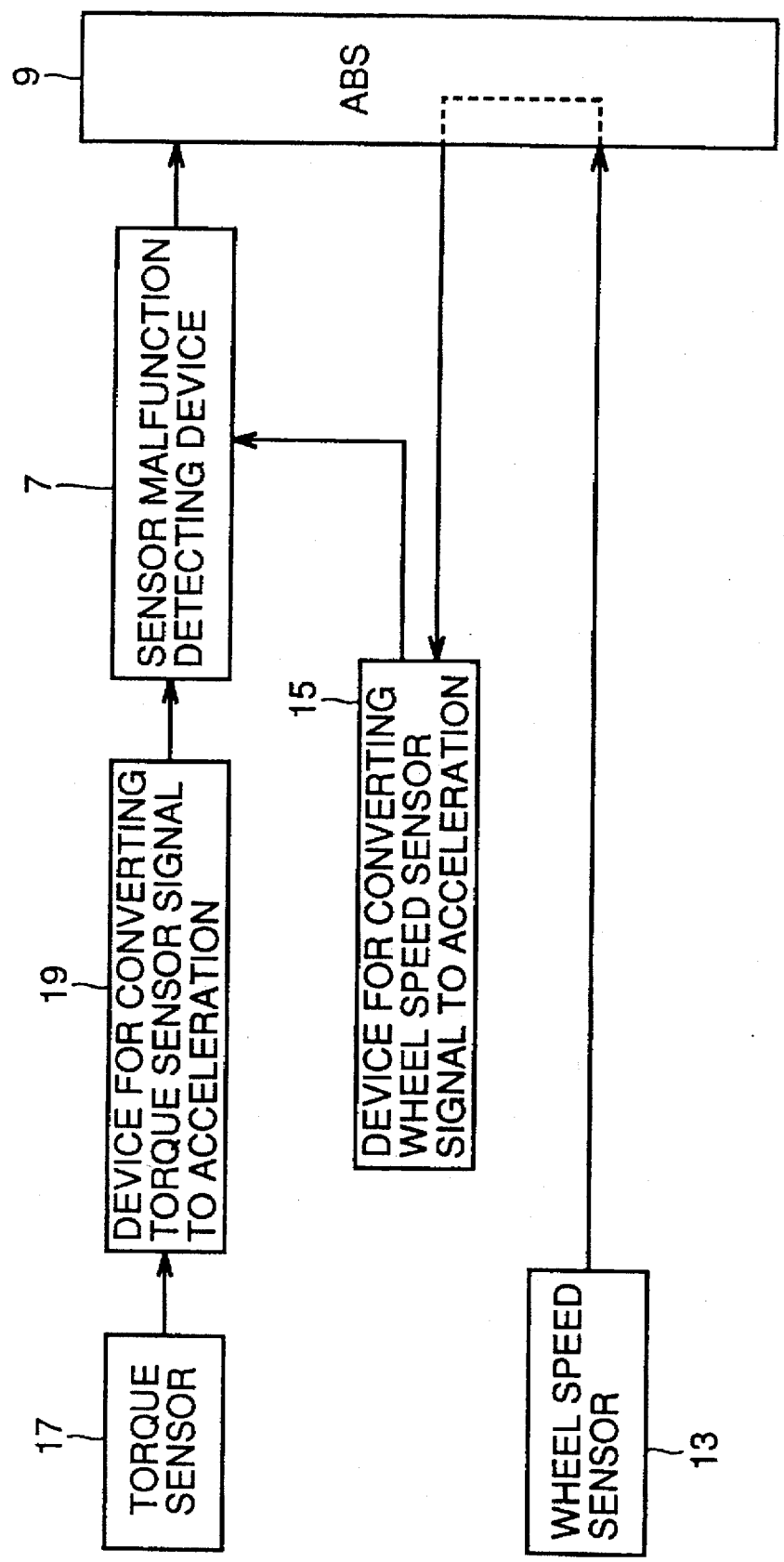
FIG. 10 is a schematic diagram showing a structure of a vehicle control system including a sensor malfunction detecting system in accordance with a fifth embodiment of the present invention.

FIG. 10 is a schematic diagram showing the structure of the vehicle control system including the sensor malfunction detecting system in accordance with the fifth embodiment of the present invention.

Referring to FIG. 10, the vehicle control system includes a torque sensor 17, a device 19 for converting a torque sensor signal to acceleration, a wheel speed sensor 13, a device 15 for converting a wheel speed sensor signal to acceleration, a sensor malfunction detecting device 7 and an ABS 9.

The device 19 for converting torque sensor signal to acceleration, the device 15 for converting wheel speed sensor signal to acceleration, and the sensor malfunction detecting device 7 constitute the sensor malfunction detecting system in accordance with the fifth embodiment.

Torque sensor 17, device 19 for converting torque sensor signal to acceleration, wheel speed sensor 13, device 15 for converting wheel speed sensor signal to acceleration and ABS 9 are the same as the sensors, the device for converting to acceleration and the ABS 9 shown in the second and third embodiments.

Figure 11:
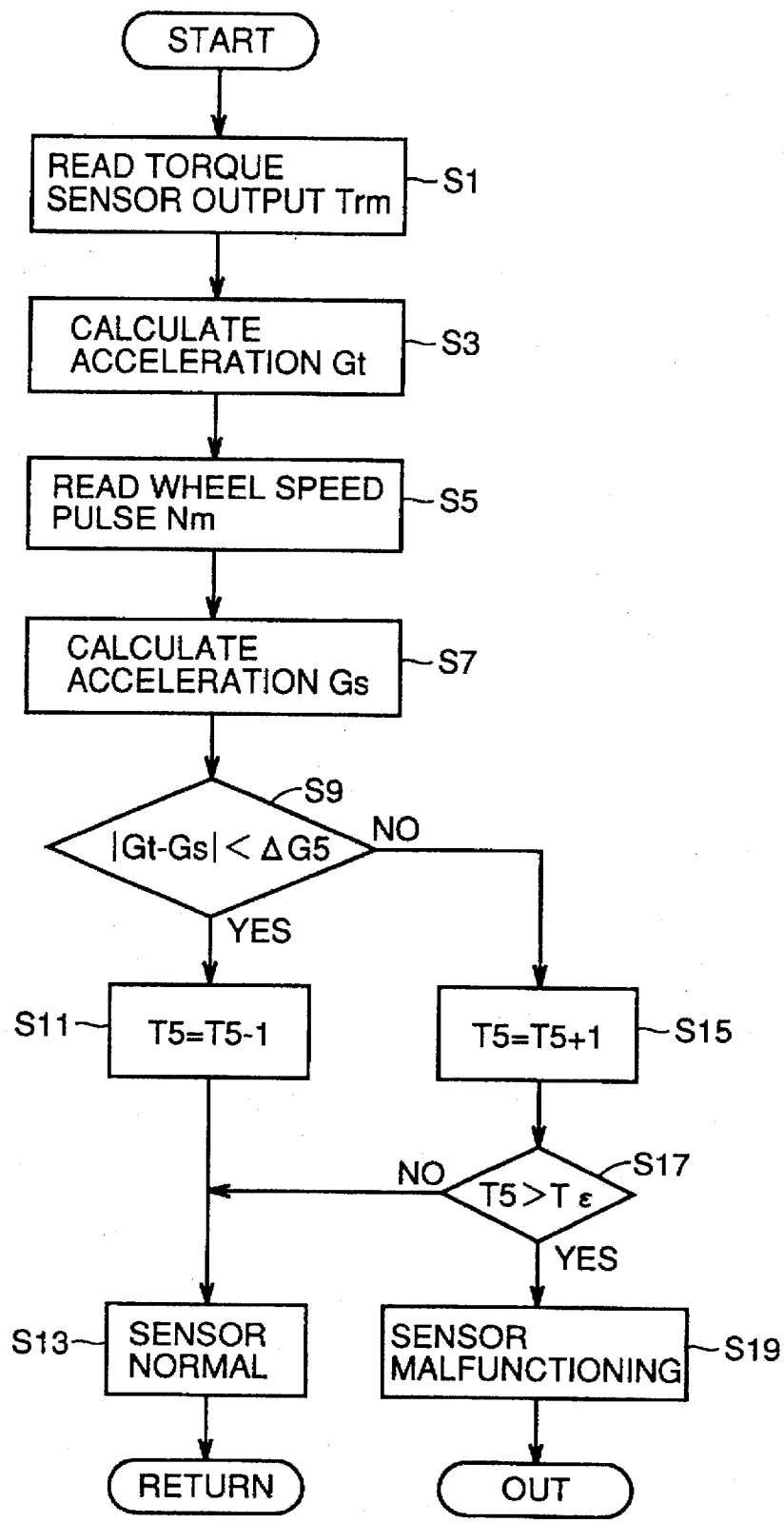
FIG. 11 is a flow chart showing the operation of the sensor malfunction detecting system in accordance with the fifth embodiment.

FIG. 11 is a flow chart showing the operation of the sensor malfunction detecting system in accordance with the fifth embodiment.

Referring to FIG. 11, in the sensor malfunction detecting system in accordance with the fifth embodiment, in step S1, the output Trm from torque sensor 17 is read.

In step S3, acceleration Gt is calculated in accordance with the equation (5) shown in the third embodiment, based on the output Trm. In S5, the sensor malfunction detecting system reads the output value (wheel speed pulse) Nm from wheel speed sensor S13.

In S7, acceleration Gs is calculated based on the vehicle body speed calculated by ABS 9 based on the output Nm from wheel speed sensor 13.

In S9, the sensor malfunction detecting system determines whether or not the absolute value of the difference between accelerations Gt and Gs is within the range of a prescribed value ΔG5.

The steps from S11 to S19 are the same as the processes from S9 to S17 of the first embodiment shown in FIG. 3.

Here, count value T5 in S11 and S15 correspond to count value T1 of steps S9 and S13 of the first embodiment shown in FIG. 3. The prescribed target value Tε of S17 corresponds to the prescribed target value Tα in S15 of the first embodiment shown in FIG. 3.

The prescribed value ΔG5 is calculated from the error in acceleration calculated based on the outputs from the torque sensor and the wheel speed sensor.

The prescribed target value Tε is, for example, set to 125, same as Tα of the first embodiment shown in FIG. 3.

As described above, in the fifth embodiment, the difference between the values based on the outputs from the torque sensor and the wheel speed sensor is calculated repeatedly, and every time it is determined that the calculated value is out of the range of the prescribed value ΔG5, the count value T5 is updated in S15. When the updated value reaches the prescribed target value Tε, it is determined that either of the sensors is malfunctioning, and the sensor malfunction signal is output.

As a result, similar effects as in the first embodiment can be obtained in the sensor malfunction detecting system in accordance with the fifth embodiment.

(Sixth Embodiment)

Figure 12:
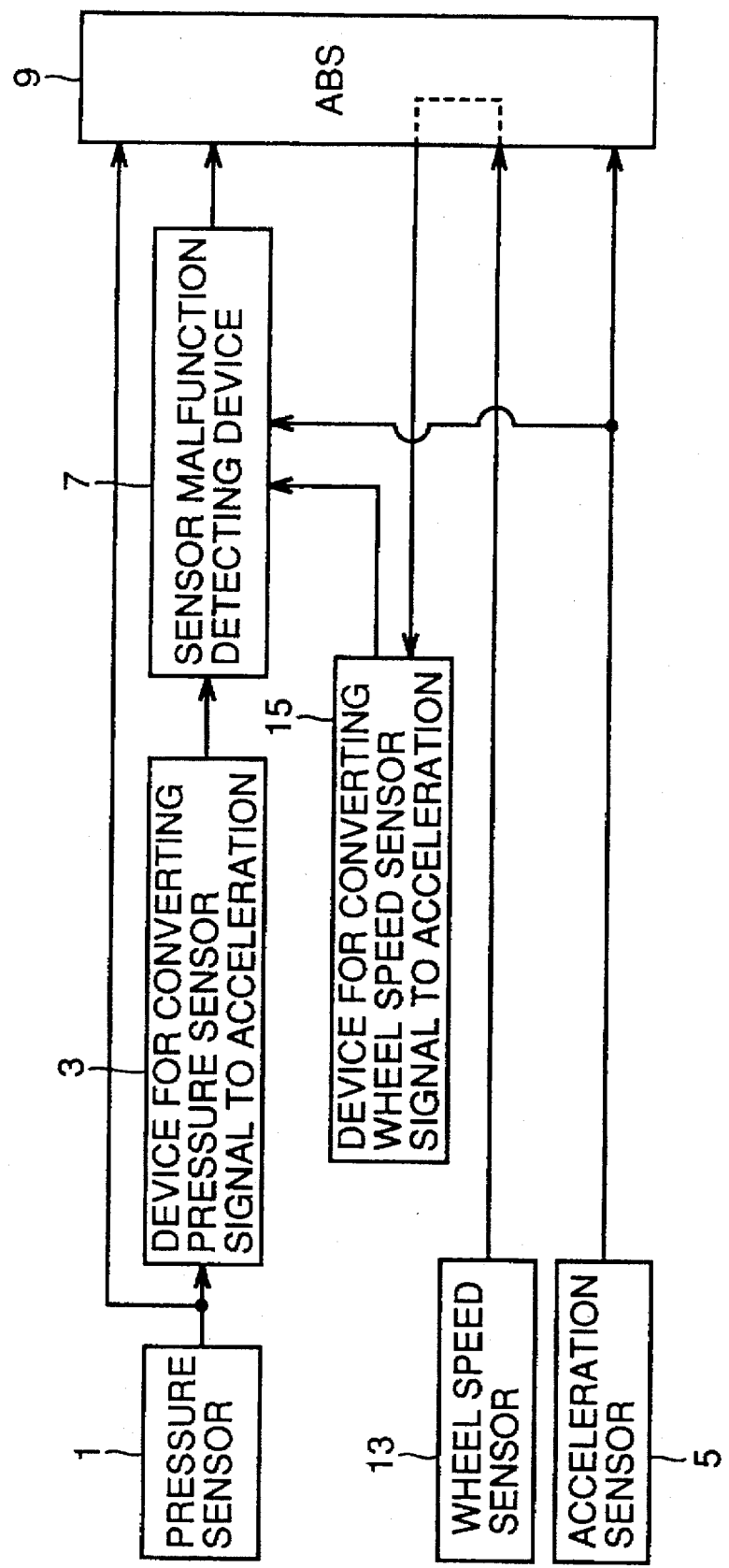
FIG. 12 is a schematic diagram showing a structure of a vehicle control system including a sensor malfunction detecting system in accordance with a sixth embodiment of the present invention.

FIG. 12 is a schematic diagram showing a structure of a vehicle control system including the sensor malfunction detecting system in accordance with the sixth embodiment of the present invention.

Referring to FIG. 12, the vehicle control system includes a pressure sensor 1, a device 3 for converting a pressure sensor signal to acceleration, a wheel speed sensor 13, a device 15 for converting a wheel speed sensor signal to acceleration, an acceleration sensor 5, a sensor malfunction detecting device 7 and an ABS 9.

The device 3 for converting pressure sensor signal to acceleration, the device 15 for converting wheel speed sensor signal to acceleration, and the sensor malfunction detecting device 7 constitute the sensor malfunction detecting system in accordance with the sixth embodiment.

Sensor malfunction detecting device 7 determines whether or not the sensor is operating normally based on the accelerations provided from the outputs of wheel speed sensor 13 and acceleration sensor 5, and if it is determined that the sensor is malfunctioning, it outputs the sensor malfunction signal to ABS 9.

Pressure sensor 1, wheel speed sensor 13, acceleration sensor 5, device 3 for converting pressure sensor signal to acceleration, device 15 for converting wheel speed sensor signal to acceleration and ABS 9 are similar to the sensors, the device for converting to acceleration and ABS shown in the first and second embodiments.

Figure 13:
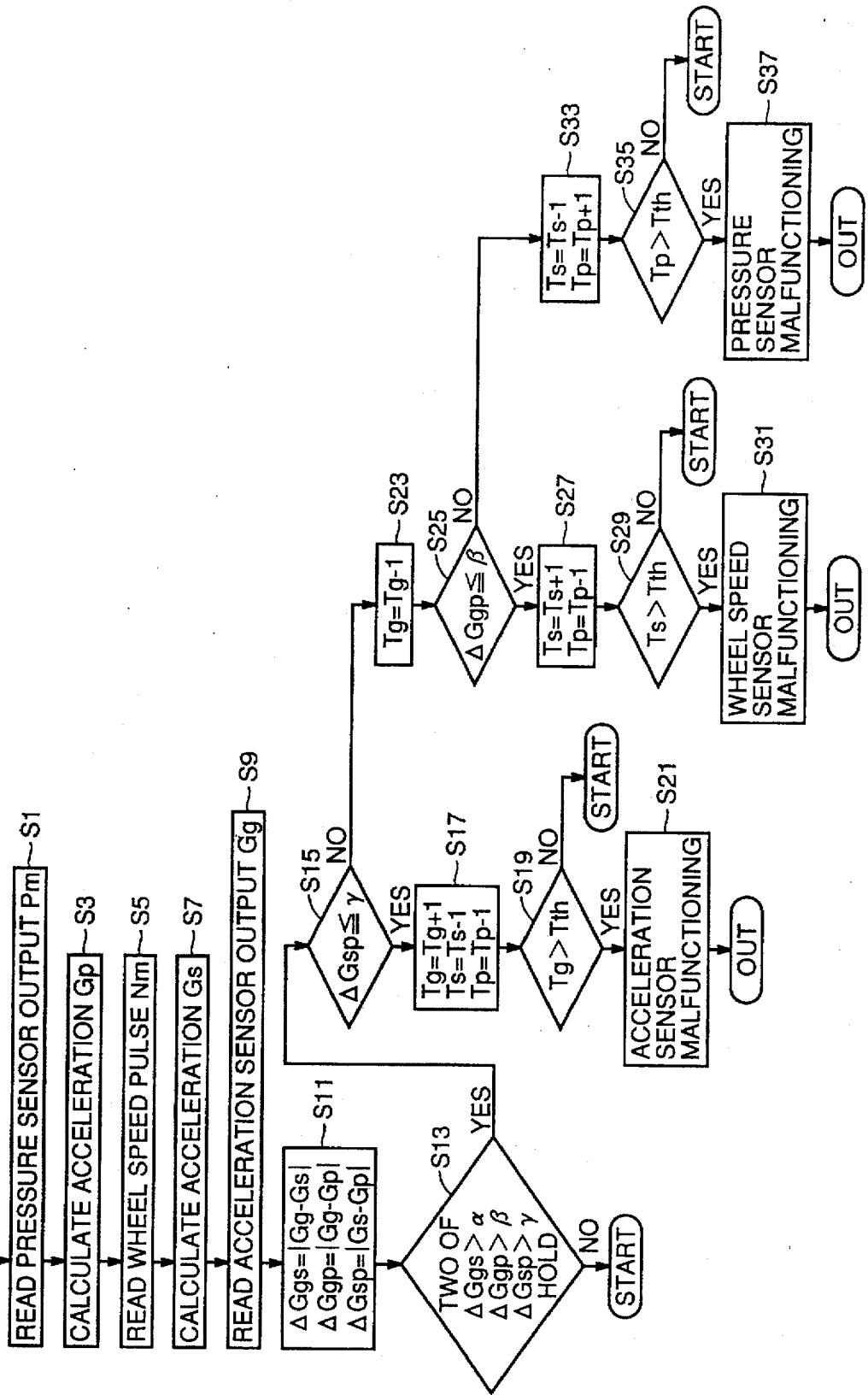
FIG. 13 is a flow chart showing the operation of the sensor malfunction detecting system in accordance with the sixth embodiment.

FIG. 13 is a flow chart showing the operation of the sensor malfunction detecting system in accordance with the sixth embodiment.

Referring to FIG. 13, in the sensor malfunction detecting system, the output value Pm from pressure sensor 1 is read in S1.

In S3, acceleration Gp of the vehicle body is calculated based on the output value Pm.

In S5, an output (wheel speed pulse) Nm is read from wheel speed sensor 13.

In S7, based on the vehicle speed calculated by ABS 9 based on the output Nm from wheel speed sensor 13, acceleration Gs is calculated.

In S9, the output (acceleration) Gg from acceleration sensor 5 is read.

In S11, the absolute value ΔGgs of the difference between accelerations Gg and Gs, the absolute value ΔGgp of the difference between accelerations Gg and Gp, and the absolute value ΔGsp of the difference between accelerations Gs and Gp are calculated. In S13, the value ΔGgs is compared with a prescribed value α, ΔGgp is compared with a prescribed value β one and ΔGsp is compared with a prescribed value γ. If any of ΔGs, ΔGgp and ΔGsp is within the range of the corresponding prescribed value and the remaining two are out of the ranges of the prescribed values, the flow proceeds to the step S15, and otherwise the flow returns to START.

In S15, the acceleration ΔGsp is compared with the prescribed value γ, and if it is within the prescribed value γ, the flow proceeds to S17, otherwise to S23.

In S17, the count value Tg corresponding to acceleration sensor 5 is incremented by "1", and count value Ts for wheel speed sensor 13 and count value Tp corresponding to pressure sensor 1 are decremented by "1", respectively.

More specifically, if the difference in acceleration ΔGsp calculated from acceleration Gs based on the wheel speed sensor 13 and the acceleration Gp based on pressure sensor 1 is within the range of the prescribed value γ, it means that the output from wheel speed sensor 13 and pressure sensor 1 related to calculation of ΔGsp are normal. Therefore, corresponding count values are decremented by 1. Meanwhile, the output of acceleration sensor 5 not related to calculation of ΔGsp is abnormal, and hence the count value Tg corresponding to acceleration sensor 5 is incremented by "1".

In S19, the count value Tg is compared with the prescribed target value Tth. If Tg exceeds Tth, it is determined that abnormal state of output has continued for a sufficiently long period of time, that the acceleration sensor 5 corresponding to count value Tg is malfunctioning in S21, and acceleration sensor malfunction signal is output. If the count value Tg is within Tth, the acceleration sensor is determined to be normally operating, and the flow returns to START.

Meanwhile, in S23, count value Tg corresponding to acceleration sensor 5 is decremented by "1", and the flow proceeds to S25.

More specifically since the value ΔGsp which is the absolute value of the difference between acceleration Gp based on pressure sensor 1 and acceleration Gs based on the wheel speed sensor 13, is out of the range of the prescribed value γ, it means that either the output of the pressure sensor 1 or the output of the wheel speed sensor 13 is incorrect, and the output from acceleration sensor 5 not related to calculation of ΔGsp is normal. Hence the corresponding count value Tg is decremented.

In S25, the difference ΔGgp in acceleration based on the output from acceleration sensor 5 and pressure sensor 1 is compared with the prescribed value β. If it is within the range of the prescribed value β, the flow proceeds to S27, otherwise it proceeds to S33.

In S27, count value Ts corresponding to wheel speed sensor 13 is incremented by "1", and count value Tp corresponding to pressure sensor 1 is decremented by "1". More specifically, of the three accelerations, two are out of the prescribed values and one is within the prescribed value in S13, and in S25 it is determined that the difference ΔGgp in acceleration based on acceleration sensor and pressure sensor is within the range of the prescribed value β. Therefore, the output from wheel speed sensor 13 not related to calculation of difference ΔGgp of acceleration is abnormal, and therefore the count value Ts corresponding to wheel speed sensor 13 is incremented by "1".

In S29, if the count value Ts corresponding to the wheel speed sensor 13 is within the prescribed target value Tth, it is determined that the wheel speed sensor is normally operating, and the flow returns to START. If the count value Ts corresponding to the wheel speed sensor exceeds the prescribed target value Tth, it is determined that the abnormal output state has continued for a sufficiently long period of time, and in step S31, it is determined that the wheel speed sensor is malfunctioning, and the wheel speed sensor malfunction signal is output.

Meanwhile, in S33, the count value Ts corresponding to the wheel speed sensor is decremented by "1", and the count value Tp corresponding to the pressure sensor is incremented by "1". More specifically, in S13, it is determined that only one of three acceleration differences is within the range of a prescribed value, and in S15 and S25, acceleration differences ΔGsp and ΔGgp are determined to be out of the ranges of the prescribed values, respectively. Therefore, the output of pressure sensor 1 which affects both out-of-range values ΔGsp and ΔGgp but is not related to calculation of acceleration difference ΔGgs which is within the range of the prescribed value is determined to be abnormal, and hence the count value, Tp corresponding to pressure sensor 1 is incremented by "1".

In S35, the count value Tp corresponding to pressure sensor 1 is compared with the prescribed target value Tth. If the count value Tp exceeds the prescribed target value Tth, it is determined that the abnormal output state has continued for a sufficiently long period of time, and in S37, it is determined that the pressure sensor 1 is malfunctioning and the pressure sensor malfunction signal is output. If the count value Tp corresponding to the pressure sensor 1 is within the prescribed target value Tth, it is determined that the pressure sensor 1 is normally operating, and the flow returns to START.

Here, in S13, the prescribed value α is calculated based on the difference in accelerations obtained from acceleration sensor 5 and wheel speed sensor 13. The error in acceleration obtained from wheel speed sensor 13 is derived from calculation error. The error in acceleration obtained from acceleration sensor 5 derives from initial variation of the sensor, temperature drift, degradation and accuracy in calculation. If the errors in wheel speed sensor 13 and acceleration sensor 5 are ±2% and ±3%, respectively, the total error of acceleration sensor 5 and wheel speed sensor 13 is ±5%.

The prescribed value β in S13 corresponds to the prescribed value ΔG1 of the first embodiment, and the prescribed value γ corresponds to the prescribed value ΔG2 of the second embodiment. The prescribed target value Tth in S19, S29 and S35 correspond to Tα in the first embodiment, and it is set to 125, for example.

As described above, in the sixth embodiment, the difference between each of the values obtained from pressure sensor, wheel speed sensor and acceleration sensor is calculated repeatedly and every time only one of the three calculated values is determined to be within the corresponding prescribed value, the count value corresponding to the sensor not related to the calculation of the value which is within the range of the prescribed value is incremented by "1". When the count value reaches the prescribed target value Tth, the sensor corresponding to the count value is determined to be malfunctioning.

As a result, the sensor malfunction detecting system prevents an undesirable influence caused by sensor malfunction on the vehicle control system. Namely, failure of the vehicle control system controlling braking force of the vehicle, for example, can be prevented, which leads to improved safety in driving.

Further, since malfunction of the sensor can be detected without using a plurality of sensors of the same type measuring the same physical amount for the same purpose, a sensor malfunction detecting system can be provided at a low cost.

(Seventh Embodiment)

Figure 14:
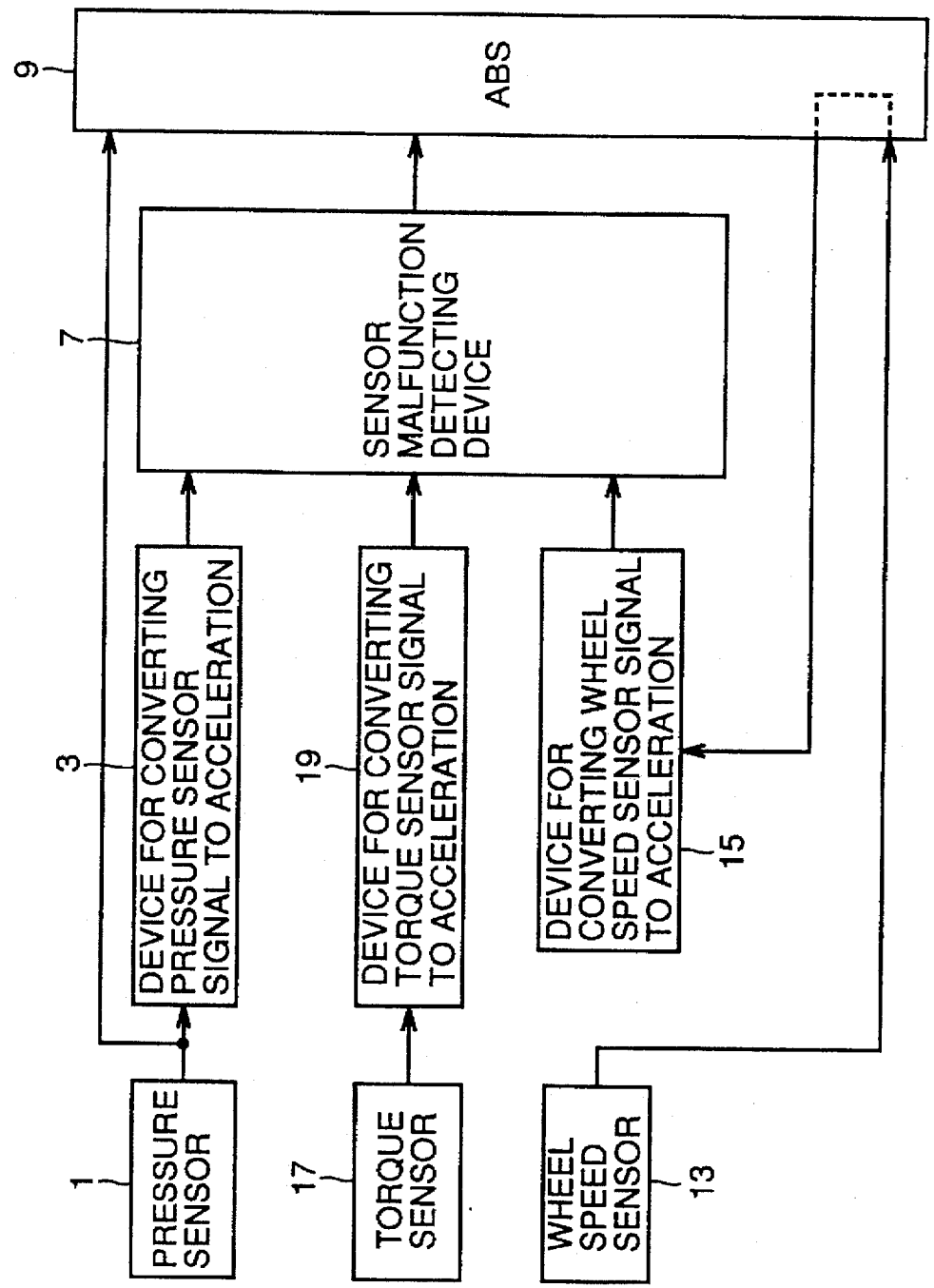
FIG. 14 is a schematic diagram showing a structure of a vehicle control system including a sensor malfunction detecting system in accordance with a seventh embodiment of the present invention.

FIG. 14 is a schematic diagram showing a structure of a vehicle control system including the sensor malfunction detecting system in accordance with the seventh embodiment of the present invention.

Referring to FIG. 14, the vehicle control system includes a pressure sensor 1, a device 3 for converting a pressure sensor signal to acceleration, a wheel speed sensor 13, a device 15 for converting a wheel speed sensor signal to acceleration, a torque sensor 17, a device 19 for converting a torque sensor signal to acceleration, a sensor malfunction detecting device 7 and an ABS 9. The device 3 for converting pressure sensor signal to acceleration, the device 15 for converting wheel speed sensor signal to acceleration, the device 19 for converting torque sensor signal to acceleration and sensor malfunction detecting device 7 constitute the sensor malfunction detecting system in accordance with the seventh embodiment.

Sensor malfunction detecting device 7 determines whether or not the sensor is normally functioning based on the accelerations obtained from the outputs from pressure sensor 1, wheel speed sensor 13 and torque sensor 17, and if it is determined that the sensor is malfunctioning, it outputs the sensor malfunction signal to ABS 9.

Pressure sensor 1, wheel speed sensor 13, torque sensor 17, the device 3 for converting pressure sensor signal to acceleration, the device 15 for converting wheel speed sensor signal to acceleration, the device 19 for converting torque sensor signal to acceleration and ABS 9 are similar to the sensors, the devices for converting to acceleration and the ABS shown in the first to fifth embodiments.

Figure 15:
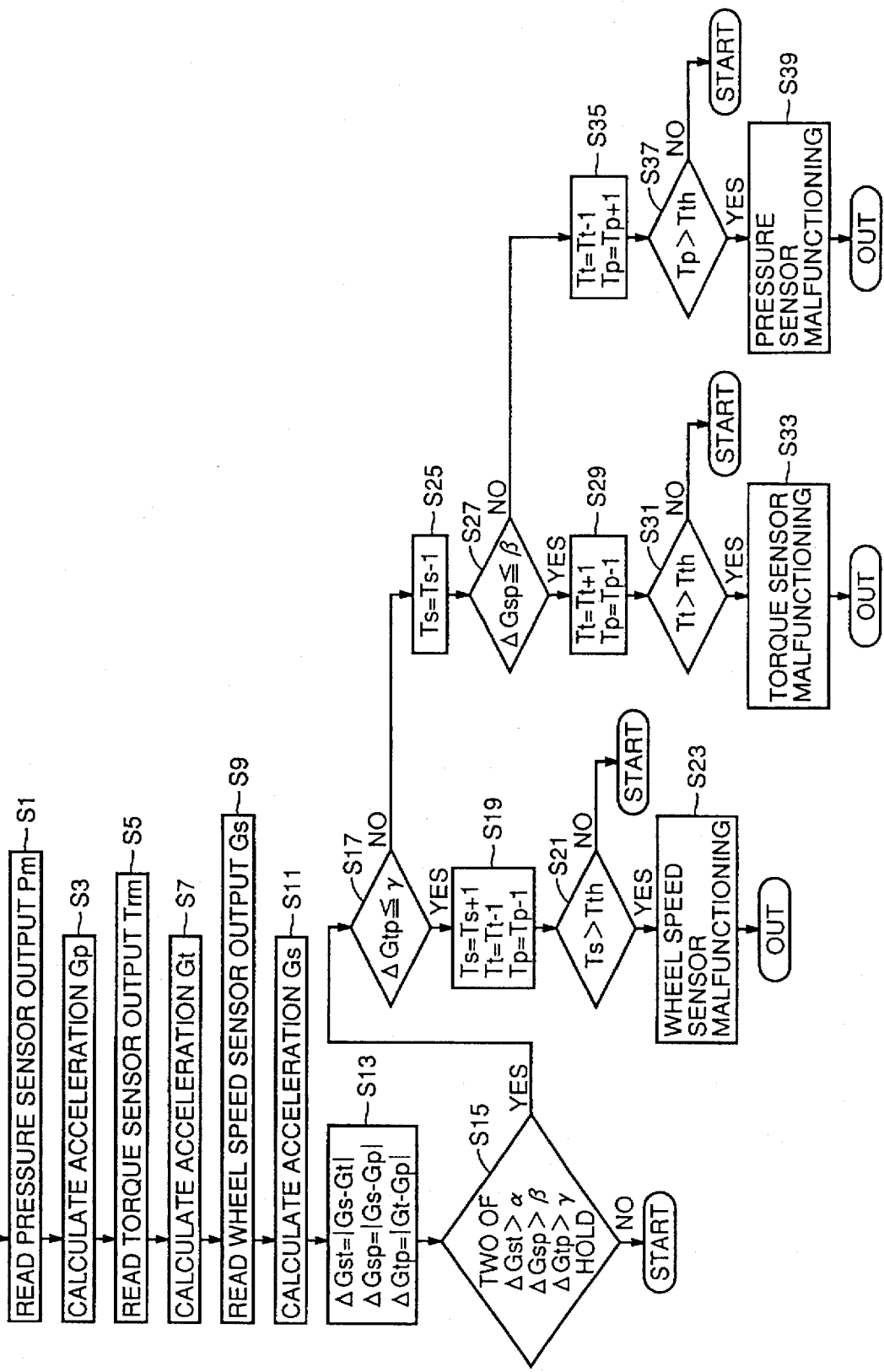
FIG. 15 is a flow chart showing the operation of the sensor malfunction detecting system in accordance with the seventh embodiment.

FIG. 15 is a flow chart showing the operation of the sensor malfunction detecting system in accordance with the seventh embodiment.

Referring to FIG. 15, the sensor malfunction detecting system reads the output value Pm from pressure sensor 1 in S1, and calculates acceleration Gp of the vehicle based on the output value Pm in S3.

In S5, the output Trm from torque sensor 17 is read, and acceleration Gt of the vehicle is calculated based on the output value Trm in S7.

In S9, the output (wheel speed pulse) Nm from wheel speed sensor 13 is read, and in S11, based on the vehicle speed that has been calculated by ABS 9 based on the output Nm from wheel speed sensor 13, acceleration Gs is calculated.

In S13, the absolute value ΔGst of the difference between accelerations Gs and Gt, the absolute value ΔGsp of the difference between accelerations Gs and Gp, and the absolute value ΔGtp of the difference between accelerations Gt and Gp are calculated.

In S15, the value ΔGst is compared with a prescribed value α, ΔGsp is compared with a prescribed value β and ΔGtp is compared with a prescribed value γ. If any one of ΔGst, ΔGsp and ΔGtp is within the range of the corresponding prescribed value and remaining two are out of the ranges of the prescribed values, the flow proceeds to S17, otherwise the flow returns to START.

In S17, acceleration ΔGtp is compared with the prescribed value γ and if it is within the prescribed value γ, the flow proceeds to S19, otherwise to S25.

In S19, the count value Ts corresponding to wheel speed sensor 13 is incremented by "1", and count value Tt corresponding to torque sensor 17 and count value Tp corresponding to pressure sensor 1 are decremented by "1", respectively.

More specifically, the fact that the acceleration ΔGtp calculated from acceleration Gt based on torque sensor 17 and acceleration Gp based on pressure sensor 1 is within the range of the prescribed value γ means that the outputs from torque sensor 17 and pressure sensor 1 related to calculation of ΔGtp are normal, and therefore count values corresponding to these sensors are decremented by 1, respectively. Meanwhile, the output from wheel speed sensor 13 not related to calculation of ΔGtp is abnormal, and hence count value Ts corresponding to the wheel speed sensor 13 is incremented by "1".

In S21, count value Ts is compared with the prescribed target value Tth, and if Ts exceeds Tth, it is determined that the abnormal output state has continued for a sufficiently long period of time. Therefore, in S23, the wheel speed sensor 13 corresponding to the count value Ts is determined to be malfunctioning, and wheel speed sensor malfunction signal is output. If the count value Ts is within Tth, wheel speed sensor is determined to be normally functioning, and the flow returns to START.

Meanwhile, in S25, the count value Ts corresponding to wheel speed sensor 13 is decremented by "1", and the flow proceeds to S27.

More specifically, since the value ΔGtp, which is the absolute value of the difference between acceleration Gp based on pressure sensor 1 and acceleration Gt based on torque sensor 17, is out of the range of the prescribed value γ, it means that either the output of the torque sensor 17 or the output of the pressure sensor 1 is incorrect, and the output from wheel speed sensor 13 not related to the calculation of ΔGtp is normal, hence the corresponding count value Ts is decrement In S27, the difference ΔGsp of acceleration based on the output from wheel speed sensor 13 and pressure sensor 1 is compared with the prescribed value β. If it is within the prescribed value β, the flow proceeds to S29. Otherwise the flow proceeds to S35.

In S29, count value Tt corresponding to torque sensor 17 is incremented by "1", and count value Tp corresponding to pressure sensor 1 is decremented by "1". Namely, in S15, it is determined that of three differences in acceleration, two are out of the range of the prescribed values and one is within the range of the prescribed value, and in S27 it is determined that the difference ΔGsp in acceleration based on the wheel speed sensor and pressure sensor is within the range of the prescribed value β, which means that the output from torque sensor 17 not related to calculation of acceleration difference ΔGsp is abnormal, and hence the count value Tt corresponding to torque sensor 17 is incremented by "1".

In S31, if the count value Tt corresponding to torque sensor 17 is within the prescribed target value Tth, the torque sensor is determined to be normally operating, and the flow returns to START. If the count value Tt corresponding to the torque sensor exceeds the predetermined target value Tth, it is determined that the abnormal output state has continued for a sufficiently long period of time, and in step S33, it is determined that the torque sensor is malfunctioning, and the torque sensor malfunction signal is output.

Meanwhile, in S35, the count value Tt corresponding to the torque sensor is decremented by "1", and count value Tp corresponding to the pressure sensor is incremented by "1". More specifically, in step S15, it is determined that only one of three differences in acceleration is within the range of the prescribed value, and in S17 and S27, differences ΔGtp and ΔGsp are determined to be out of the ranges of the prescribed values, respectively. Therefore, it is determined that the output from pressure sensor 1 which is related to the calculation of ΔGsp and of ΔGtp which are out of the prescribed range, and which is not related to calculation of the difference ΔGst in acceleration which is in the range of the prescribed value, is determined to be abnormal, and hence the count value Tp corresponding to the pressure sensor 1 is incremented by "1".

In S37, the count value Tp corresponding to pressure sensor 1 is compared with the prescribed target value Tth. If the count value Tp exceeds the prescribed target value Tth, it is determined that the abnormal output state has continued for a sufficiently long period of time, and in S39, the pressure sensor 1 is determined to be malfunctioning and the pressure sensor malfunction signal is output. If the count value Tp corresponding to the pressure sensor 1 is within the prescribed target value Tth, it is determined that the pressure sensor 1 is normally operating, and the flow returns to START.

In S15, the prescribed value α corresponds to the prescribed value ΔG5 shown in FIG. 11 of the fifth embodiment, the prescribed value β corresponds to the prescribed value ΔG2 shown in FIG. 5 of the second embodiment, the prescribed value γ corresponds to the prescribed value ΔG3 shown in FIG. 7 of the third embodiment. The prescribed target value Tth in steps S21, S31 and S37 corresponds to Tα of the first embodiment, and it is set to 125, for example.

As described above, in the seventh embodiment, the difference between each of the values based on the pressure sensor, the wheel speed sensor and the torque sensor is repeatedly calculated, and every time it is determined that only one of the three calculated values is within the range of a corresponding prescribed value, a count value corresponding to the sensor which is not related to the calculation of the calculated value which is within the range of the prescribed value is incremented by "1". When the count value reaches a prescribed target value Tth, it is determined that the sensor corresponding to the count value is malfunctioning.

As a result, similar effects as in the sixth embodiment can be obtained by the sensor malfunction detecting system in accordance with the seventh embodiment.

(Eighth Embodiment)

Figure 16:
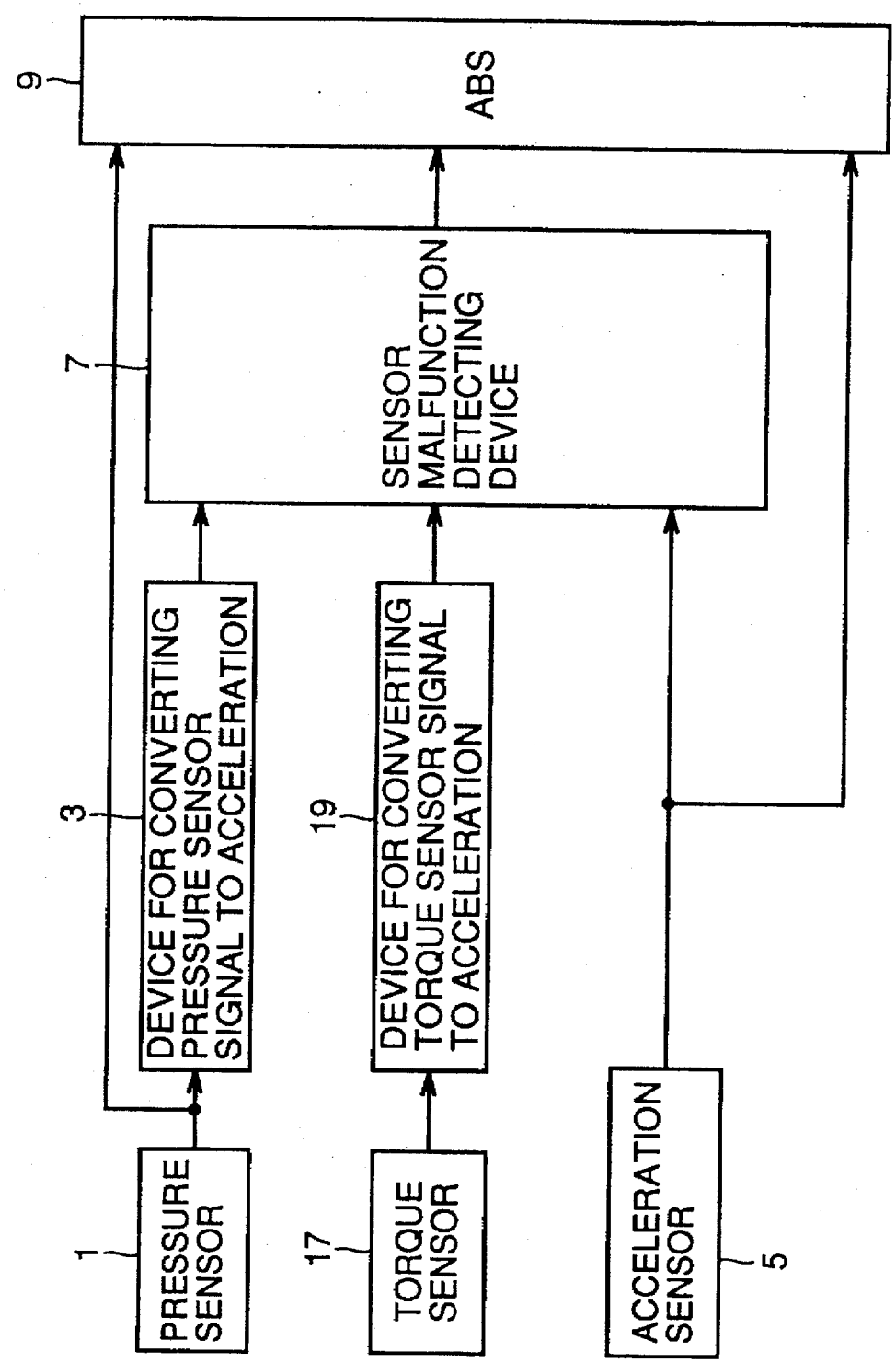
FIG. 16 is a schematic diagram showing a structure of a vehicle control system including a sensor malfunction detecting system in accordance with an eighth embodiment of the present invention.

FIG. 16 is a schematic diagram showing a structure of a vehicle control system including the sensor malfunction detecting system in accordance with the eighth embodiment of the present invention.

Referring to FIG. 16, the vehicle control system includes a pressure sensor 1, a device 3 for converting a pressure sensor signal to acceleration, an acceleration sensor 5, a torque sensor 17, a device 19 for converting a torque sensor signal to acceleration, a sensor malfunction detecting device 7 and an ABS 9.

The device 3 for converting pressure sensor signal to acceleration, the device 19 for converting torque sensor signal to acceleration, and the sensor malfunction detecting device 7 constitute the sensor malfunction detecting system in the eighth embodiment.

The sensor malfunction detecting device 7 determines whether or not the sensor is operating normally based on the accelerations obtained from the outputs from pressure sensor 1, acceleration sensor 5 and torque sensor 17, and if it is determined that a sensor is malfunctioning, it provides a sensor malfunction signal to ABS 9.

Pressure sensor 1, acceleration sensor 5, torque sensor 17, device 3 for converting pressure sensor signal to acceleration, the device 19 for converting torque sensor signal to acceleration and ABS 9 are similar to the sensors, devices for converting to acceleration and the ABS shown in the first to fifth embodiments.

Figure 17:
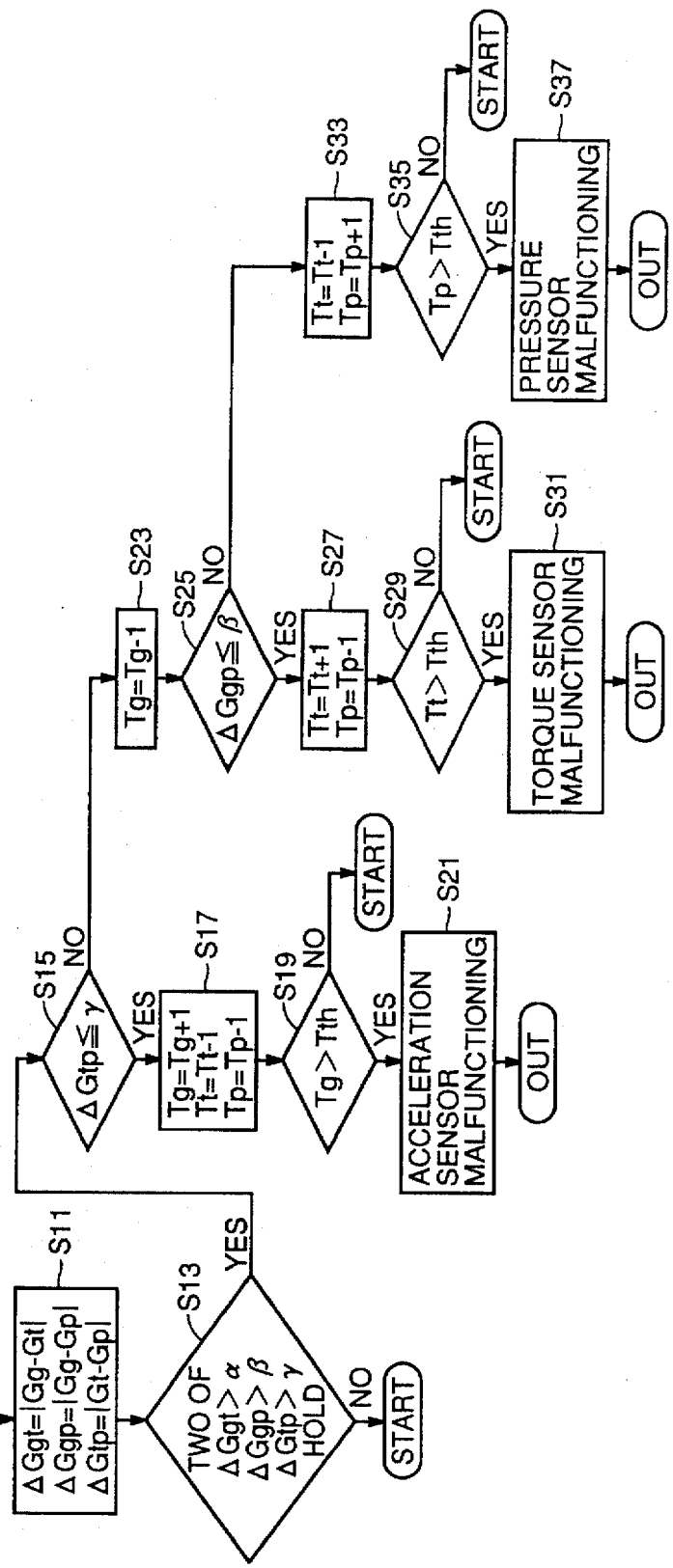
FIG. 17 is a flow chart showing the operation of the sensor malfunction detecting system in accordance with the eighth embodiment.

FIG. 17 is a flow chart showing the operation of the sensor malfunction detecting system in accordance with the eighth embodiment.

Referring to FIG. 17, the sensor malfunction detecting system reads the output value Pm of pressure sensor 1 in step S1, and in S3, calculates acceleration Gp of the vehicle based on the output value Pm.

In S5, the output Trm from torque sensor 17 is read, and in step S7, acceleration Gt of the vehicle is calculated based on the output value Trm.

In S9, the output (acceleration) Gg from acceleration sensor 5 is read.

In S11, the absolute value ΔGgt of the difference between accelerations Gg and Gt, the absolute value ΔGgp of the difference between accelerations Gg and Gp, and the absolute value ΔGtp of the difference between accelerations Gt and Gp are calculated.

In S13, the value ΔGgt is compared with a prescribed value α, ΔGgp is compared with a prescribed value β and ΔGtp is compared with a prescribed value γ. If any one of the values ΔGgt, ΔGgp and ΔGtp is within the range of the corresponding prescribed value and the remaining two are out of the ranges of the prescribed values, the flow proceeds to S15, and otherwise the flow returns to START.

In S15, the acceleration ΔGtp is compared with a prescribed value γ and if it is within the prescribed value γ, the flow proceeds to S17. Otherwise it proceeds to S23.

In S17, a count value Tg corresponding to acceleration sensor 5 is incremented by "1", and count value Tt corresponding to torque sensor 17 and count value Tp corresponding to pressure sensor 1 are decremented by "1", respectively.

More specifically, the fact that the difference ΔGtp in acceleration calculated by acceleration Gt based on torque sensor 17 and acceleration Gp based on pressure sensor 1 is within the range of the prescribed value γ, means that the outputs from torque sensor 17 and pressure sensor 1 related to calculation of ΔGtp are normal. Therefore, count values corresponding to these sensors are decremented by "1". Meanwhile, the output from acceleration sensor 5 not related to the calculation of ΔGtp is abnormal. Therefore, the count value Tg corresponding to acceleration sensor 5 is incremented by "1".

In S19, the count value Tg is compared with the prescribed target value Tth. If Tg exceeds Tth, it is determined that the abnormal output state has continued for a sufficiently long period of time, and in S21 it is determined that the output of acceleration sensor 5 corresponding to count value Tg is abnormal, and acceleration sensor malfunction signal is output. If count value Tg is within Tth, it is determined that the acceleration sensor is normally operating, and the flow returns to START.

Meanwhile, in S23, the count value Tg corresponding to acceleration sensor 5 is decremented by "1", and the flow proceeds to S25.

More specifically, the value ΔGtp, which is the absolute value of the difference between acceleration Gp based on pressure sensor 1 and acceleration Gt based on torque sensor 17, is out of the range of the prescribed value γ. Thus the output from acceleration sensor 5 not related to calculation of ΔGtp is determined to be normal, and hence the corresponding count value Tg is decremented.

In S25, if the difference ΔGgp in acceleration based on the outputs from acceleration sensor 13 and pressure sensor 1 is within the prescribed value β, the flow proceeds to S27. Otherwise, it proceeds to S33.

In S27, the count value Tt corresponding to torque sensor 17 is incremented by "1", and count value Tp corresponding to pressure sensor 1 is decremented by "1". In S13, it had been determined that two of the three differences in acceleration are out of the ranges of the prescribed values and one is within the range of the prescribed value, and in S25 it had been determined that the difference ΔGgp in acceleration based on the acceleration sensor and the pressure sensor is within the range of the prescribed value β. Therefore, the output from torque sensor 17, which is not related to the calculation of the difference ΔGgp in acceleration, is abnormal. Therefore, count value Tt corresponding to torque sensor 17 is incremented by "1".

Then, in S29, if the count value Tt corresponding to torque sensor 17 is within the prescribed target value Tth, it is determined that the torque sensor is normally operating, and the flow returns to START. IF the count value Tt corresponding to the torque sensor exceeds the prescribed target value Tth, it is determined that the abnormal output state has continued for a sufficiently long period of time, and in S31, it is determined that the torque sensor is malfunctioning, and the torque sensor malfunction signal is output.

In S33, the count value Tt corresponding to the torque sensor is decremented by "1", and the count value Tp corresponding to the pressure sensor is incremented by "1". Namely, in S13 it was determined that only one of the three accelerations is within the range of the prescribed value, and in steps S15 and S25 the differences ΔGtp and ΔGgp in acceleration were determined to be out of the ranges of the prescribed values, respectively. Therefore, the output of pressure sensor 1 which is related to the calculation of the both out-of-range differences ΔGtp and ΔGgp and which is not related to the calculation of the difference ΔGgt that is within the range of the prescribed value, is determined to be abnormal, and hence the count value Tp corresponding to pressure sensor 1 is incremented by "1".

In S35, the count value Tp corresponding to pressure sensor 1 is compared with the prescribed target value Tth. If the count value Tp exceeds the predetermined target value Tth, it is determined that the abnormal output state has continued for a sufficiently long period of time, and in step S37, it is determined that the pressure sensor 1 is malfunctioning and the pressure sensor abnormal signal is output. If the count value Tp corresponding to pressure sensor 1 is within the prescribed target value Tth, it is determined that the pressure sensor 1 is normally operating, and the flow returns to START.

Here, the prescribed value α in S13 corresponds to the prescribed value ΔG4 in the fourth embodiment shown in FIG. 9, the prescribed value β corresponds to the prescribed value ΔG1 of the first embodiment shown in FIG. 3, and the prescribed value γ corresponds to the prescribed value ΔG3 of the third embodiment shown in FIG. 7. Further, the prescribed target value Tth in steps S19, S29 and S35 corresponds to the value Tα in the first embodiment shown in FIG. 3, and it is set to 125, for example.

As described above, in the eighth embodiment, the difference between each of the values obtained based on the pressure sensor, the torque sensor and the acceleration sensor is calculated repeatedly and every time it is determined that only one of the three calculated values is within the range of the corresponding prescribed value, the count value corresponding to the sensor not related to the calculation of the calculated value which is within the range of the prescribed value is incremented by "1". When the count value reaches the prescribed target value Tth, the sensor corresponding to the count value is determined to be malfunctioning.

As a result, similar effects as in the sixth embodiment can be obtained by the sensor malfunction detecting system in accordance with the eighth embodiment.

(Ninth Embodiment)

Figure 18:
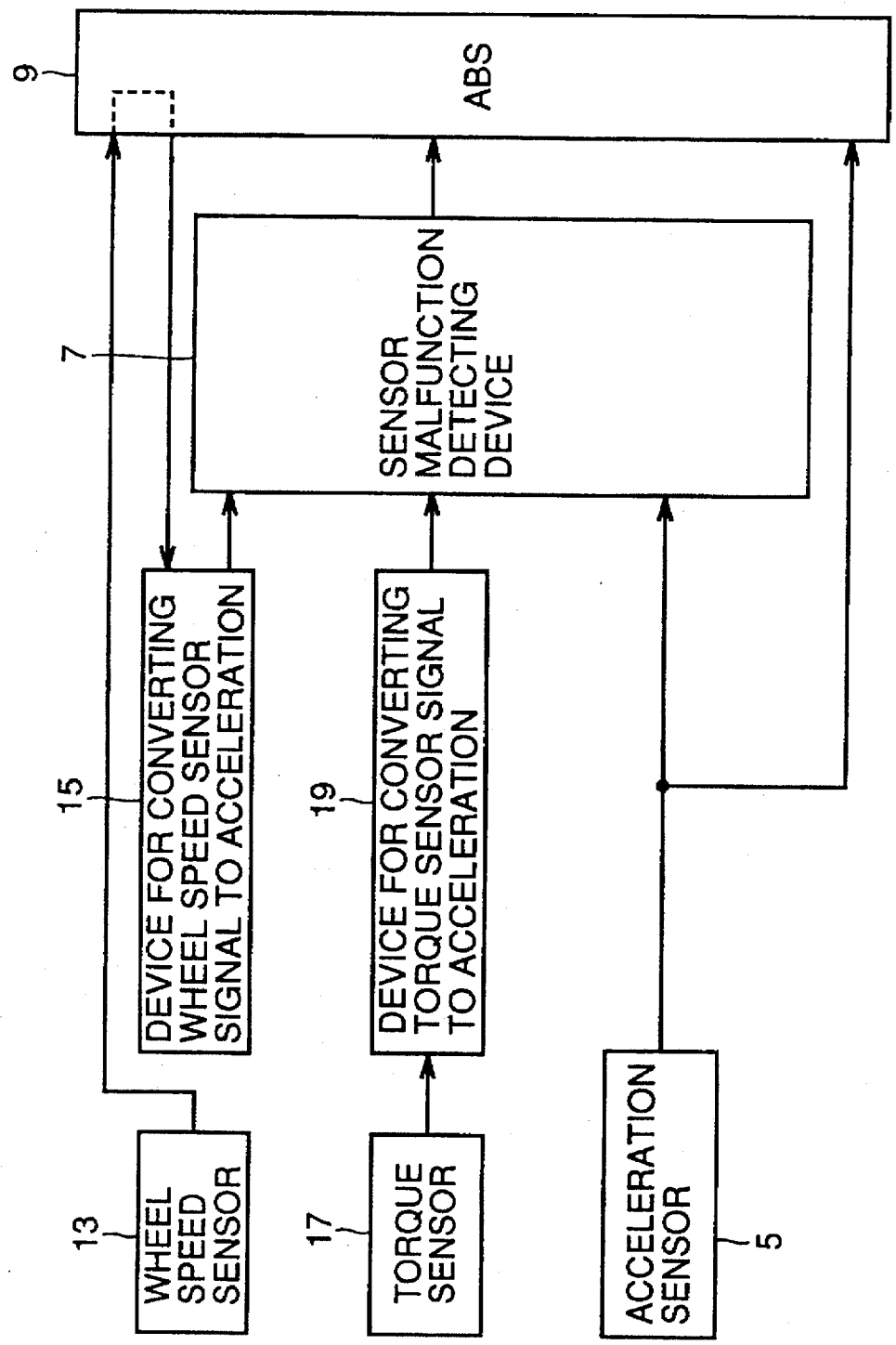
FIG. 18 is a schematic diagram showing a structure of a vehicle control system including a sensor malfunction detecting system in accordance with a ninth embodiment of the present invention.

FIG. 18 is a schematic diagram showing a structure of a vehicle control system including the sensor malfunction detecting system in accordance with the ninth embodiment of the present invention.

Referring to FIG. 18, the vehicle control system includes a wheel speed sensor 13, a device 15 for converting a wheel speed sensor signal to acceleration, an acceleration sensor 5, a torque sensor 17, a device 19 for converting a torque sensor signal to acceleration, a sensor malfunction detecting device 7 and an ABS 9.

The device 15 for converting wheel speed sensor signal to acceleration, the device 19 for converting torque sensor signal to acceleration and the sensor malfunction detecting device 7 constitute the sensor malfunction detecting system in accordance with the ninth embodiment.

Sensor malfunction detecting device 7 determines whether or not the sensors are normally operating based on the accelerations obtained from the outputs from wheel speed sensor 13, acceleration sensor 5 and torque sensor 17, and if it is determined that a sensor is malfunctioning, it outputs a sensor malfunction signal to ABS 9.

Wheel speed sensor 13, acceleration sensor 5, torque sensor 17, device 15 for converting pressure sensor signal to acceleration, device 19 for converting torque sensor signal to acceleration and ABS 9 are similar to the sensors, the devices for converting to acceleration and the ABS shown in the first to fifth embodiments.

Figure 19:
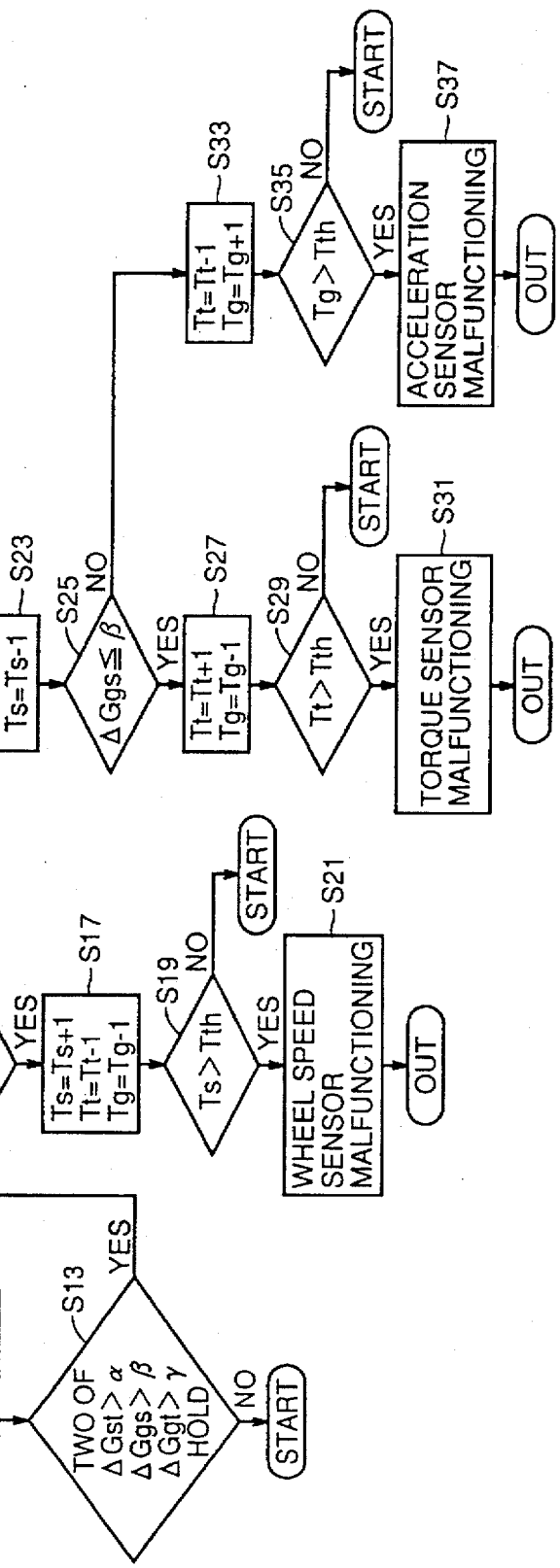
FIG. 19 is a flow chart showing the operation of the sensor malfunction detecting system in accordance with the ninth embodiment.

FIG. 19 is a flow chart showing the operation of the sensor malfunction detecting system in accordance with the ninth embodiment.

Referring to FIG. 19, the sensor malfunction detecting system reads the output value Nm of wheel speed sensor 13 in S1, and calculates acceleration Gs of the vehicle based on the output value Nm in S3.

In S5, the output Trm from torque sensor 17 is read, and acceleration Gt of the vehicle is calculated based on the output value Trm in S7.

In S9, output (acceleration) Gg from acceleration sensor 5 is read.

In S11, the absolute value ΔGgt of the difference between accelerations Gg and Gt, the absolute value ΔGgs between accelerations Gg and Gs and the absolute value ΔGst between accelerations Gs and Gt are calculated.

In S13, the value ΔGst is compared with the prescribed value α, ΔGgs is compared with a prescribed value β and ΔGgt is compared with a prescribed value γ. If any one of ΔGst, ΔGgs and ΔGgt is within the range of the corresponding prescribed value and the remaining two are out of the ranges of the prescribed values, the flow proceeds to S15. Otherwise, the flow returns to START.

In S15, acceleration ΔGgt is compared with the prescribed value γ and if it is within the prescribed value γ, the flow proceeds to S17. Otherwise it proceeds to S23.

In S17, the count value Ts corresponding to the wheel speed sensor 13 is incremented by "1", and count value Tt corresponding to torque sensor 17 and count value Tg corresponding to acceleration sensor 5 are decremented by "1", respectively. More specifically, the fact that the difference ΔGgt in acceleration calculated based on the accelerations Gt and Gg from torque sensor 17 and acceleration sensor 5, respectively, is within the range of the prescribed value γ means that the outputs from acceleration sensor 5 and torque sensor 17 which are related to calculation of ΔGgt are normal, and hence the count values corresponding to these sensors are decremented by "1". Meanwhile, the output from wheel speed sensor 13 which is not related to the calculation of ΔGgt is abnormal, and hence the count value Ts corresponding to wheel speed sensor 13 is incremented by "1".

In S19, the count value Ts is compared with a prescribed target value Tth. If Ts exceeds Tth, it is determined that the abnormal output state has continued for a sufficiently long period of time, and in S21 it is determined that the wheel speed sensor 13 corresponding to the count value Ts is malfunctioning, and wheel speed sensor malfunction signal is output. If the count value Ts is within Tth, it is determined that the wheel speed sensor is normally operating, and the flow returns to START.

Meanwhile, in S23, the count value Ts corresponding to the wheel speed sensor 13 is decremented by "1", and the flow proceeds to S25.

More specifically, the value ΔGgt, which is the absolute value of the difference between acceleration Gg based on acceleration sensor 5 and acceleration Gt based on torque sensor 17, is out of the range of the prescribed value γ. Thus the output from wheel speed sensor 13 not related to calculation of ΔGgt is normal, and hence the corresponding count value Ts is decremented by "1".

In S25, if the difference ΔGgs in acceleration based on the outputs from acceleration sensor 5 and wheel speed sensor 13 is within the prescribed value β, the flow proceeds to S27. Otherwise, the flow proceeds to S33.

In S27, the count value Tt corresponding to torque sensor 17 is incremented by "1", and the count value Tg corresponding to acceleration sensor 5 is decremented by "1". More specifically, in S13, it was is determined that two of the three differences in acceleration are out of the ranges of the prescribed values and that one is within the range of the prescribed value, and in S25 it was determined that the difference ΔGgs in acceleration based on the acceleration sensor and the wheel speed sensor is within the range of the prescribed value β. Thus the output from torque sensor 17 which is not related to calculation of the difference ΔGgs of acceleration is abnormal. Therefore, count value Tt corresponding to torque sensor 17 is incremented by "1".

In S29, if the count value Tt corresponding to torque sensor 17 is within the prescribed target value Tth, the torque sensor is determined to be normally operating, and the flow returns to START. If the count value Tt corresponding to the torque sensor exceeds the prescribed target value Tth, it is determined that the abnormal output state has continued for a sufficiently long period of time, and in S31 it is determined that the torque sensor is malfunctioning and the torque sensor malfunction signal is output.

Meanwhile in S33, the count value Tt corresponding to the torque sensor is decremented by "1" and the count value Tg corresponding to the acceleration sensor is incremented by "1". More specifically, in S13, it was determined that only one of the three accelerations is within the range of the prescribed value, and in steps S15 and S25 it was determined that the differences ΔGgt and ΔGgs are out of the ranges of the prescribed values, respectively. Therefore, the output from acceleration sensor 5, which is not related to the calculation of the difference ΔGst in acceleration which is within the range of the prescribed value, is determined to be abnormal. Henced the count value Tg corresponding to the acceleration sensor 5 is incremented by "1".

In S35, the count value Tg corresponding to acceleration sensor 5 is compared with the prescribed target value Tth. If the count value Tg exceeds the prescribed target value Tth, it is determined that the abnormal output state has continued for a sufficiently long period of time, and in S37, it is determined that acceleration sensor 5 is malfunctioning and an acceleration sensor malfunction signal is output. If the count value Tg corresponding to acceleration sensor 5 is within the prescribed target value Tth, it is determined that acceleration sensor 5 is normally operating, and the flow returns to START.

Here, the prescribed value α in S13 corresponds to the prescribed value ΔG5 in the fifth embodiment shown in FIG. 11, the prescribed value β corresponds to the prescribed value α of the sixth embodiment shown in FIG. 13, and the prescribed value γ corresponds to the prescribed value ΔG4 of the fourth embodiment shown in FIG. 9. Further, the prescribed target value Tth in steps S19, S29 and S35 corresponds to the value Tα in the first embodiment shown in FIG. 3, and it is set to 125, for example.

As described above, in the ninth embodiment, the difference between each of the values obtained from the wheel speed sensor, the torque sensor and the acceleration sensor is calculated repeatedly, and every time it is determined that only one of the three calculated values is within the range of a corresponding prescribed value, the count value corresponding to the sensor not related to calculation of the calculated value which is within the range of the prescribed value is incremented by "1". If the count value reaches the prescribed target value Tth, the sensor corresponding to the count value is determined to be malfunctioning.

As a result, the similar effects as in the sixth embodiment can be obtained by the sensor malfunction detecting system in accordance with the ninth embodiment.

Although the present invention has been described and illustrated in detail, it is clearly understood that the same is by way of illustration and example only and is not to be taken by way of limitation, the spirit and scope of the present invention being limited only by the terms of the appended claims.

What is claim is:

1. A sensor malfunction detecting system in a control system for a vehicle using output values from first and second sensors of different types as control information, comprising:

calculating means for repeatedly calculating a difference between an acceleration value based on an output from said first sensor and a value based on an output from said second sensor;

determining means for repeatedly determining whether said difference calculated by said calculating means is within a prescribed range that is calculated based on at least one of an initial variation error of one of said sensors a temperature drift of one of said sensors a degradation of one of said sensors, and a calculation accuracy of said calculating means;

counting means for storing a count value and selectively updating said count value in accordance with a result of said determining by said determining means, in which said count value is updated every time it is determined by said determining means that said difference is out of said prescribed range; and malfunction determining means for determining that one of said sensors is malfunctioning when said count value updated by said counting means reaches a prescribed target value;

wherein said determining means and said counting means are respectively implemented by arithmetic operations in a processor.

2. The sensor malfunction detecting system according to claim 1, wherein said first and second sensors are a combination of a pressure sensor for detecting an hydraulic pressure of a brake system of the vehicle and an acceleration sensor for detecting an acceleration of the vehicle.

3. The sensor malfunction detecting system according to claim 1, wherein said first and second sensors are a combination of a pressure sensor for detecting an hydraulic pressure of a brake system of the vehicle and a wheel speed sensor for detecting a number of rotations of a wheel of the vehicle.

4. The sensor malfunction detecting system according to claim 1, wherein said first and second sensors are a combination of a pressure sensor for detecting an hydraulic pressure of a brake system of the vehicle and a torque sensor for detecting a brake torque of the brake system.

5. The sensor malfunction detecting system according to claim 1, wherein said first and second sensors are a combination of a torque sensor for detecting a brake torque of a brake system of the vehicle and an acceleration sensor for detecting an acceleration of the vehicle.

6. The sensor malfunction detecting system according to claim 1, wherein said first and second sensors are a combination of a torque sensor for detecting a brake torque of a brake system of the vehicle and a wheel speed sensor for detecting a number of rotations of a wheel of the vehicle.

7. A sensor malfunction detecting system for a control system for a vehicle using output values from first, second and third sensors of three different types as control information, comprising:

first calculating means for repeatedly calculating a first difference between an acceleration value based on an output from said first sensor and a value based on an output from said second sensor;

second calculating means for repeatedly calculating a second difference between said acceleration value based on said output from said first sensor and a value based on an output from said third sensor;

third calculating means for repeatedly calculating a third difference between said value based on said output from said second sensor and aid value based on said output from said third sensor;

determining means for repeatedly determining whether said first difference calculated by said first calculating means, said second difference calculated by said second calculating means and said third difference calculated by said third calculating means are respectively within prescribed first, second and third ranges that are respectively calculated based on at least one of an initial variation error of one of said sensors, a temperature drift of one of said sensors, a degradation of one of said sensors, and a calculation accuracy of one of said calculating means;

counter means for storing first, second and third count values corresponding to said first, second and third sensors, respectively, and for selectively updating said first, second and third count values in accordance with a result of said determining by said determining means, in which every time it is determined by said determining means that only one of said first, second and third differences is within said first, second and third prescribed ranges respectively, one of said count values corresponding to one of said sensors which is not related to calculation of said difference that was determined to be within said respective prescribed range is updated; and malfunction determining means for determining, when any one of said first, second and third count values updated by said counter means reaches a prescribed target value, that one of said sensors corresponding to said any one of said first, second and third count values that reaches said prescribed target value is malfunctioning;

wherein said determining means and said counter means are respectively implemented by arithmetic operations in a processor.

8. The sensor malfunction detecting system according to claim 7, wherein a combination of said first, second, and third sensors is a combination of a pressure sensor for detecting an hydraulic pressure of a brake system of the vehicle, a wheel speed sensor for detecting a number of rotations of a wheel of the vehicle and an acceleration sensor for detecting an acceleration of the vehicle.

9. The sensor malfunction detecting system according to claim 7, wherein a combination of said first, second and third sensors is a combination of a pressure sensor for detecting an hydraulic pressure of a brake system of the vehicle, a wheel speed sensor for detecting a number of rotations of a wheel of the vehicle and a torque sensor for detecting a brake torque of the brake system.

10. The sensor malfunction detecting system according to claim 7, wherein a combination of said first, second and third sensors is a combination of a pressure sensor for detecting an hydraulic pressure of a brake system of the vehicle, an acceleration sensor for detecting an acceleration of the vehicle and a torque sensor for detecting a brake torque of the brake system.

11. The sensor malfunction detecting system according to claim 7, wherein a combination of said first, second and third sensors is a combination of a wheel speed sensor for detecting a number of rotations of a wheel of the vehicle, an acceleration sensor for detecting an acceleration of the vehicle and a torque sensor for detecting a brake torque of a brake system of the vehicle.

* * * * *

UNITED STATES PATENT AND TRADEMARK OFFICE
CERTIFICATE OF CORRECTION

PATENT NO. : 5,671,981
DATED : Sep. 30, 1997
INVENTOR(S) : Sasaki et al.

It is certified that error appears in the above-identified patent and that said Letters Patent is hereby corrected as shown below:

On the title Page:
    In the Abstract, line 3, after "sensor" insert --,--;
                          line 8, after "value" insert --,--. (second occurrence)

| | | |
|---|---|---|
| Col. 4, | line 29, | replace "rotations" by --rotation--; |
| | line 52, | replace "of rate" by --rate of--; |
| | line 58, | delete "of" (first occurrence). |
| Col. 6, | line 67, | replace "of" (second occurrence) by --if--. |
| Col. 13, | line 21, | after "ΔGsp" insert --,--; |
| | line 65, | after "sensor 1" insert --,--. |
| Col. 14, | line 1, | after "value" insert --,--; |
| | line 2, | after "value" delete ",". |
| Col. 16, | line 17, | replace "decrement" by --decremented.--. |
| Col. 21, | line 7, | after "Thus" insert --,--; |
| | line 18, | delete "is"; |
| | line 48, | replace "Henced" by --Hence,--. |
| Col. 22, | line 36, | after "sensors" (both instances) insert --,--. |
| Col. 23, | line 25, | replace "aid" by --said--. |

Signed and Sealed this

Sixteenth Day of December, 1997

Attest:

BRUCE LEHMAN

Attesting Officer      Commissioner of Patents and Trademarks